US012190411B2

(12) United States Patent
Odan et al.

(10) Patent No.: US 12,190,411 B2
(45) Date of Patent: Jan. 7, 2025

(54) DISPLAY DEVICE, DISPLAY METHOD, AND NON-TRANSITORY STORAGE MEDIUM

(71) Applicant: JVCKENWOOD Corporation, Yokohama (JP)

(72) Inventors: Shohei Odan, Yokohama (JP); Tetsuya Suwa, Yokohama (JP); Hideo Tsuru, Yokohama (JP); Hayato Nakao, Yokohama (JP); Takayuki Sugahara, Yokohama (JP); Motomu Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/324,181

(22) Filed: May 26, 2023

(65) Prior Publication Data

US 2023/0298223 A1 Sep. 21, 2023

Related U.S. Application Data

(63) Continuation of application No. PCT/JP2021/043602, filed on Nov. 29, 2021.

(30) Foreign Application Priority Data

Nov. 30, 2020 (JP) .................................. 2020-198624
Nov. 30, 2020 (JP) .................................. 2020-198647
Nov. 30, 2020 (JP) .................................. 2020-199156

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/011* (2013.01); *G06V 20/20* (2022.01); *G06V 20/50* (2022.01)

(58) Field of Classification Search
CPC . G06T 11/00; G06T 7/00; G06F 3/011; G06F 3/013; G06F 3/0481; G06V 20/20;
(Continued)

(56) References Cited

U.S. PATENT DOCUMENTS

2017/0236304 A1* 8/2017 Kempinski ............. G06F 3/013
382/117
2019/0212564 A1* 7/2019 Rousseau ................ G06F 3/013
(Continued)

FOREIGN PATENT DOCUMENTS

JP         2006-119297         5/2006
JP         2010-170316         8/2010
(Continued)

OTHER PUBLICATIONS

International Search Report and Written Opinion for International Application No. PCT/JP2021/043602 mailed on Feb. 1, 2022, 9 pages.

*Primary Examiner* — Sahlu Okebato
(74) *Attorney, Agent, or Firm* — Amin, Turocy & Watson, LLP

(57) ABSTRACT

A display device includes a display in which an image is displayed; an output controller configured to display an image in the display; an imager configured to capture an image of an object present within a field of view of a user; a visually recognized object identifying unit configured to identify, based on the captured image, a type of the object present within the field of view of the user; and a visual recognition count identifying unit configured to, based on an identification result by the visually recognized object identifying unit, identify a visual recognition count indicating a number of times by which the user has looked at the object for each of the identified type, wherein the output controller is further configured to display in the display, based on the
(Continued)

visual recognition count, a sub image including information on the object for each of the identified type.

12 Claims, 16 Drawing Sheets

(51) Int. Cl.
  *G06V 20/20* (2022.01)
  *G06V 20/50* (2022.01)
(58) Field of Classification Search
  CPC ...... G06V 20/50; G06V 10/764; G02B 27/02; G09G 5/00; G09G 5/36; H04N 7/18
  See application file for complete search history.

(56) References Cited

U.S. PATENT DOCUMENTS

| | | | |
|---|---|---|---|
| 2020/0234470 A1* | 7/2020 | Chen | ........................ G09G 5/02 |
| 2021/0064129 A1 | 3/2021 | Yasuda et al. | |
| 2021/0157867 A1* | 5/2021 | Bastide | ............... G06F 16/9024 |
| 2022/0230400 A1 | 7/2022 | Nakata | |

FOREIGN PATENT DOCUMENTS

| | | |
|---|---|---|
| JP | 2010-211000 | 9/2010 |
| JP | 2015-064513 | 4/2015 |
| JP | 2019-160112 | 9/2019 |
| JP | 2021-018575 | 2/2021 |
| WO | 2019/135313 | 7/2019 |

* cited by examiner

NON-DISPLAY MODE

DISPLAY DEVICE, DISPLAY METHOD, AND NON-TRANSITORY STORAGE MEDIUM

CROSS-REFERENCE TO RELATED APPLICATIONS

This application is a Continuation of PCT International Application No. PCT/JP2021/043602 filed on Nov. 29, 2021 which claims the benefit of priority from Japanese Patent Application No. 2020-198624 filed on November 30, Japanese Patent Application No. 2020-198647 filed on November 30, and Japanese Patent Application No. 2020-199156 filed on Nov. 30, 2020, the entire contents of all of which are incorporated herein by reference.

FIELD OF THE INVENTION

The present invention relates to a display device, a display method, and a non-transitory storage medium.

BACKGROUND OF THE INVENTION

Nowadays, information devices are undergoing significant advancement due to a high-speed CPU, a screen display technology with high definition, advancement in a compact and lightweight battery technology, and popularization and bandwidth widening of a wireless network environment. Regarding such information devices, not only the smartphones have become popular as a representative example, but so-called wearable devices that are worn by a user have also become popular. Examples of a wearable device include a head mount display (HMD) that provides visual information and that is used in augmented reality (AR) and virtual reality (VR). For example, in Japanese Patent Application Laid-open No. 2010-170316, as a technology for taking into account a color tone of an object when the object is superimposed onto an image in which a real space is captured by an AR technology, a technology is disclosed that corrects the color tone of the object based on the color tone of a marker placed in the real space.

In a display device such as an HMD that is used to display images, a display form remains uniform regardless of a user of the display device. Hence, there is a demand for enabling appropriate adjustment of the display form according to the user of the display device.

An display device, a display method, and a non-transitory storage medium are disclosed.

SUMMARY OF THE INVENTION

According to one aspect of the present application, there is provided a display device comprising: a display in which an image is displayed; an output controller configured to display an image in the display; an imager configured to capture an image of an object present within a field of view of a user; a visually recognized object identifying unit configured to identify, based on the image captured by the imager, a type of the object present within the field of view of the user; and a visual recognition count identifying unit configured to identify, based on an identification result by the visually recognized object identifying unit, a visual recognition count which indicates a number of times by which the user has looked at the object for each of the identified type, wherein the output controller is further configured to display in the display, based on the visual recognition count, a sub image which includes information on the object for each of the identified type.

According to one aspect of the present application, there is provided a display method for displaying an image in a display, comprising: acquiring a captured image in which an object present within field of view of a user is included; identifying, based on the image, a type of the object present within the field of view of the user; identifying, based on an identification result about the type of the object present within the field of view of the user, a visual recognition count which indicate a number of times by which the user has looked at the object for each of the identified type; and displaying in the display, based on the visual recognition count, a sub image which includes information on the object for each of the identified type.

According to one aspect of the present application, there is provided a non-transitory storage medium that stores a computer program that causes a computer to execute: acquiring a captured image in which an object present within field of view of a user is included; identifying, based on the image, a type of the object present within the field of view of the user; identifying, based on an identification result about the type of the object present within the field of view of the user, a visual recognition count which indicate a number of times by which the user has looked at the object for each of the identified type; and displaying in the display, based on the visual recognition count, a sub image which includes information on the object for each of the identified type.

The above and other objects, features, advantages and technical and industrial significance of this application will be better understood by reading the following detailed description of presently preferred embodiments of the application, when considered in connection with the accompanying drawings.

DETAILED DESCRIPTION OF THE INVENTION

Exemplary embodiments are described below in detail with reference to the accompanying drawings. However, the present application is not limited by the embodiments described below.

First Embodiment

Figure 1:
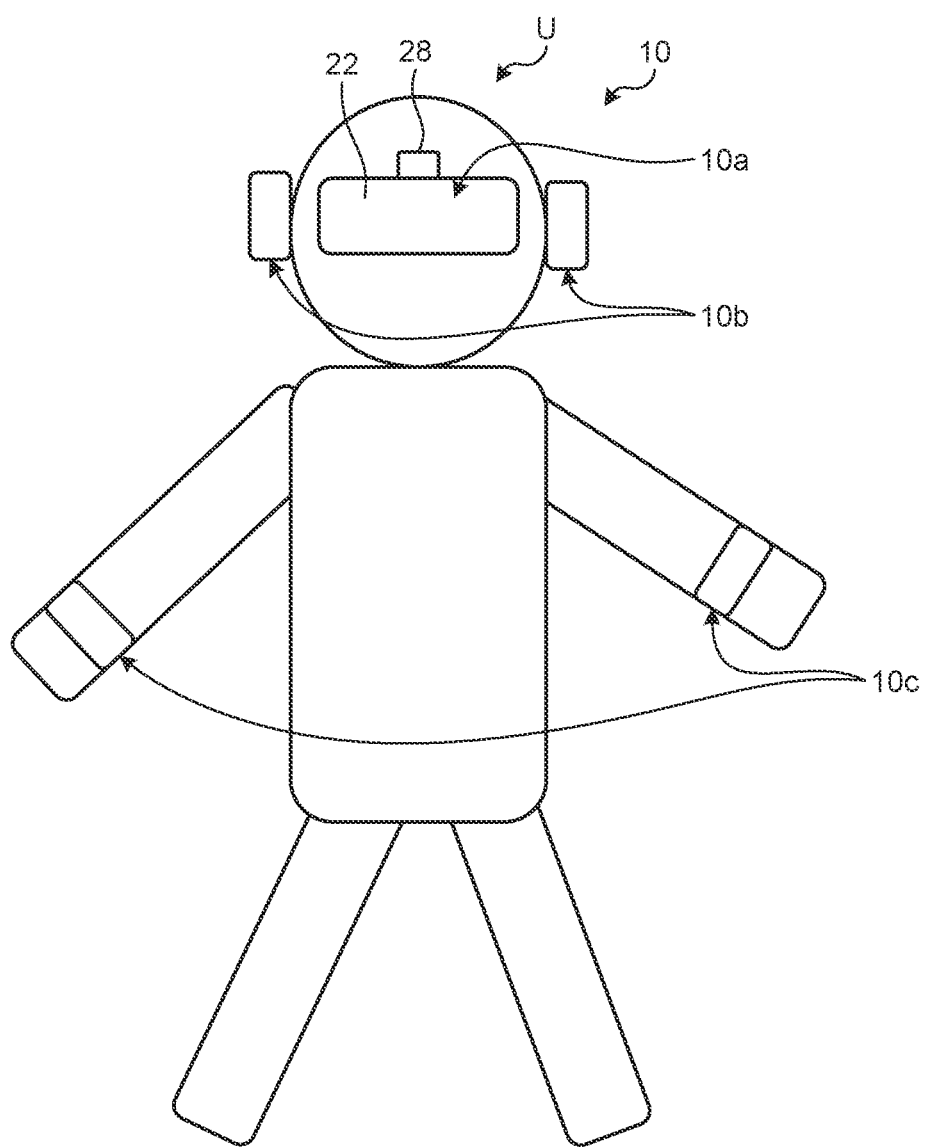
FIG. 1 is a schematic diagram illustrating a display device according to a first embodiment.

FIG. 1 is a schematic diagram illustrating a display device according to a first embodiment. A display device 10 according to the first embodiment displays images. As illustrated in FIG. 1, the display device 10 is so-called a wearable device that is attached to a body of a user U. In the first embodiment, the display device 10 includes a device 10a that is attached to eyes of the user U, devices 10b that are attached to ears of the user U, and devices 10c that are attached to arms of the user U. The device 10a that is attached to the eyes of the user U includes a display 22 (explained later) which outputs visual stimuli (images) to the user U. Each device 10b that is attached to an ear of the user U includes a sound output unit which outputs auditory stimuli (sounds) to the user U. Each device 10C that is attached to an arm of the user U includes a tactile stimulus output unit which outputs tactile stimuli to the user U. However, the configuration illustrated in FIG. 1 is only exemplary, and the number of devices as well as the attachment positions on the user U can be set in an arbitrary manner. For example, the display device 10 need not include the devices 10b or the devices 10c. Moreover, for example, the display device 10 is not limited to be a wearable device. Alternatively, the display device 10 can be a device carried along by the user U, such as a smartphone or a tablet terminal.

Main Image

Figure 2:
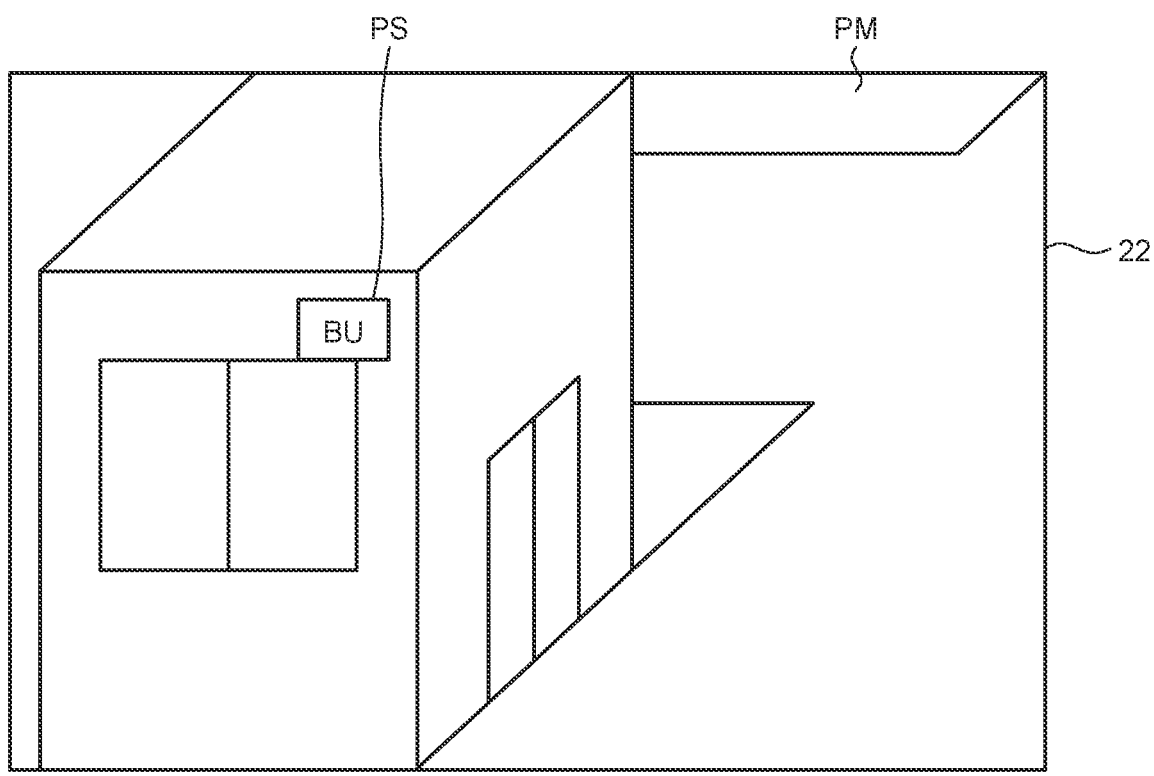
FIG. 2 is a diagram illustrating an exemplary image displayed in the display device.

FIG. 2 is a diagram illustrating an exemplary image displayed in the display device 10. As illustrated in FIG. 2, the display device 10 provides a main image PM to the user U via the display 22. With that, the user U who is wearing the display device 10 becomes able to view the main image PM. In the first embodiment, the main image PM is an image of a scenery that would be visible to the user U without wearing the display device 10. Thus, the main image PM can also be said to be an image of the actual object present within a field of view of the user U. Herein, the field of view implies a viewable range centered around a line of sight of the user U without any movement of the eyes. In the first embodiment, the display device 10 provides the main image PM to the user U by, for example, letting an outside light (an ambient visible light) pass through the display 22. That is, in the first embodiment, it can be said that the user U directly views a picture of the actual scenery through the display 22. However, the display device 10 is not limited to enable the user U to directly view the picture of the actual scenery. Alternatively, an image of the main image PM can be displayed in the display 22 and provided to the user U via the display 22. In that case, the user U views, as the main image PM, an image of the scenery as displayed in the display 22. In that case, in the display 22, the display device 10 displays, as the main image PM, an image that is captured by an imager 28 (explained later) and that covers the field of view of the user U. With reference to FIG. 2, roads and a building are included in the main image PM. However, that is merely an example.

Sub Image

As illustrated in FIG. 2, the display device 10 displays a sub image PS in the display 22 and in a superimposed manner onto the main image PM that is provided through the display 22. Thus, the sub image PS is an image superimposed onto the main image PM, and can be said to be an image of an object other than the actual scenery present within the field of view of the user U. That is, as a result of superimposing the sub image PS onto the main image PM that represents the actual scenery, it can be said that the display device 10 provides an augmented reality (AR) to the user U.

In the first embodiment, the sub image PS includes information related to an object that is included in the main image P. That is, the sub image PS can be said to be an image including the information related to an actual object present within the field of view of the user U (i.e., the information related to an object which is currently viewed by the user U). Meanwhile, the sub image PS is set for each object. When a particular object is included in the main image PM (i.e., when the user U is viewing that particular object), the sub image PS is displayed in regard to that object. In the example illustrated in FIG. 2, the object viewed by the user U is a building structure, and the sub image PS is displayed as the information related to that building structure. In FIG. 2, the sub image PS indicates characters "BU". However, that is merely an example.

In this way, the display device 10 provides the main image PM and the sub image PS. Apart from that, the display device 10 can also display, in the display 22, a content image of some content that is different from the main image PM and the sub image PM. The content image can be of an arbitrary content such as a movie or a television program. Meanwhile, the display device 10 can be configured to display the sub image PS without providing the main image PM.

Configuration of Display Device

Figure 3:
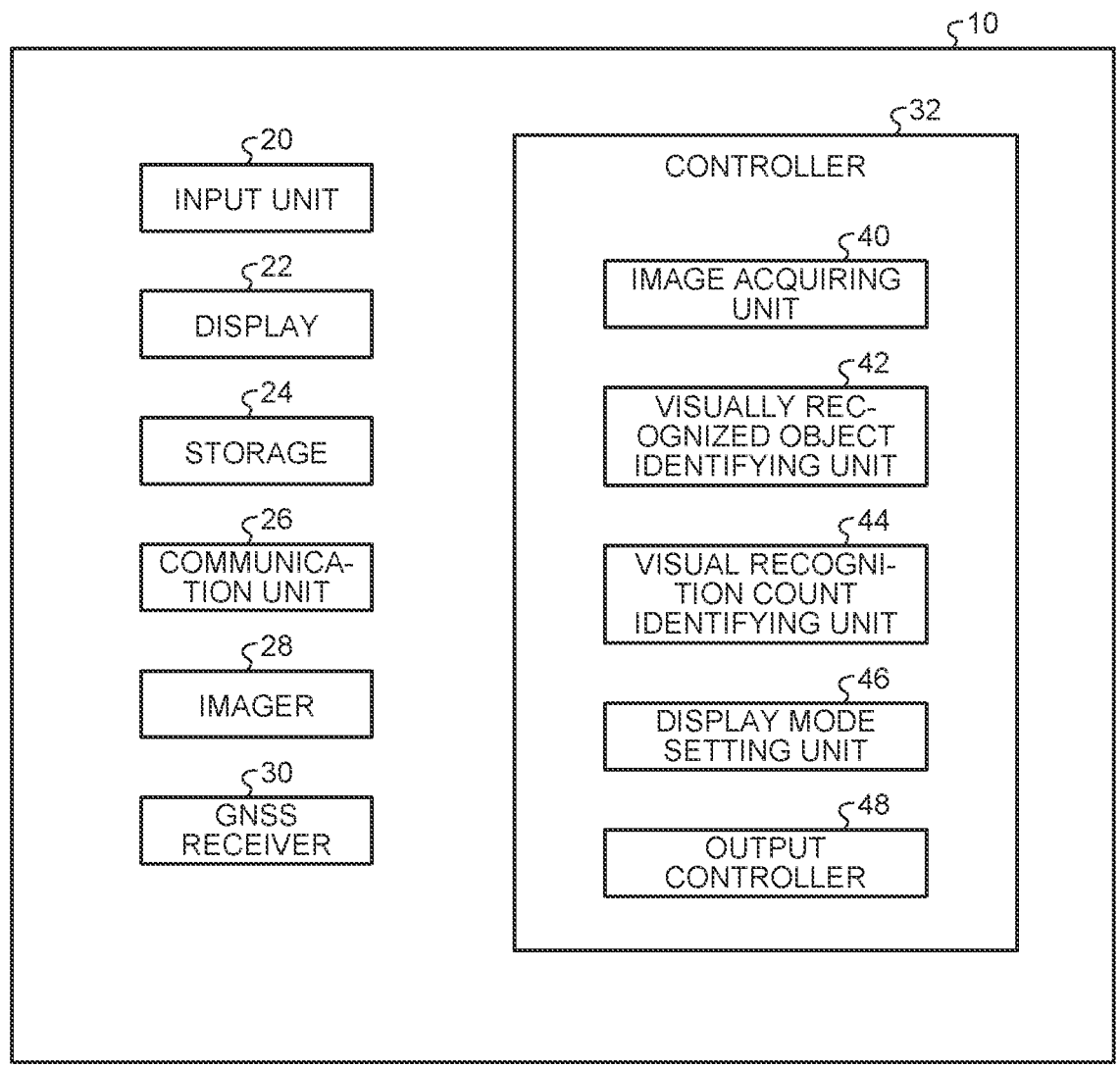
FIG. 3 is a schematic block diagram of the display device according to the first embodiment.

FIG. 3 is a schematic block diagram of the display device according to the first embodiment. As illustrated in FIG. 3, the display device 10 includes an input unit 20, the display 22, a storage 24, a communication unit 26, the imager 28, a GNSS receiver 30, and a controller 32.

The input unit 20 receives user operations, and can be a touch-sensitive panel, for example. The display 22 is a display used to display images. In the first embodiment, the display 22 is so-called a head mount display (HMD). Meanwhile, besides including the display 22 as an output unit, it is also possible to including other output units such as a sound output unit (speaker) that outputs sounds and a tactile stimulus output unit that outputs tactile stimuli to the user U. The tactile stimulus output unit operates in a physical manner to generate vibrations, and outputs tactile stimuli to the user. However, a type of the tactile stimuli is not limited to vibrations, and any arbitrary type of tactile stimuli can be output.

The storage 24 is used to store a variety of information such as arithmetic operation details of the controller 32 and computer programs. The storage 24 includes at least one of a main memory device, such as a random access memory (RAM) or a read only memory (ROM), and an external memory device such as a hard disk drive (HDD). The computer programs for the controller 32 stored in the storage 24 can alternatively be stored in a recording medium readable by the display device 10.

The communication unit 26 is a module for communicating with external devices, and can include an antenna, for example. In the first embodiment, wireless communication is implemented as the communication method in the communication unit 26. However, it is possible to implement any arbitrary communication method.

The imager 28 is a camera that captures the object present within the field of view of the user U. The imager 28 is installed at a position at which the imaging range overlaps with the field of view of the user U. In the example illustrated in FIG. 1, the imager 28 is installed in the device 10a in such a way that an imaging direction is coincident with an orientation of a face of the user U. As a result, the imager 28 becomes able to capture the object present within the field of view of the user U. The imager 28 can be a video camera that performs imaging at a predetermined framerate. Meanwhile, it is possible to have an arbitrary number of imagers 28 installed. Thus, there can be only one imager 28, or there can be multiple imagers 28. When multiple imagers 28 are present, the information along the orientations of the multiple imagers 28 can also be acquired.

The GNSS receiver 30 detects position information of the display device 10. Herein, the position information implies terrestrial coordinates. In the first embodiment, since the display device 10 is attached to the user U, the position of the user U is same as the position of the display device 10. Hence, it can be said that the GNSS receiver 30 detects the position information of the user U. In the first embodiment, the GNSS receiver 30 is so-called a GNSS module (GNSS stands for a Global Navigation Satellite System) that receives radio waves from satellites and detects the position information of the display device 10 (the user U). Meanwhile, in the first embodiment, the GNSS receiver 30 is not a required component.

The controller 32 is an arithmetic device, that is, a central processing unit (CPU). The controller 32 includes an image acquiring unit 40, a visually recognized object identifying unit 42, a visual recognition count identifying unit 44, a display mode setting unit 46, and an output controller 48. The controller 32 reads a computer program (software) from the storage 24 and executes it so as to implement operations of the image acquiring unit 40, the visually recognized object identifying unit 42, the visual recognition count identifying unit 44, the display mode setting unit 46, and the output controller 48. Meanwhile, the controller 32 can perform such operations by a single CPU or multiple CPUs when installed therein. Moreover, at least some units from among the image acquiring unit 40, the visually recognized object identifying unit 42, the visual recognition count identifying unit 44, the display mode setting unit 46, and the output controller 48 can be implemented by hardware.

The image acquiring unit 40 controls the imager 28 to capture images, and then acquires the images (image data) from the imager 28. That is, the image acquiring unit 40 acquires the images (image data) which are captured by the imager 28 and which covers the field of view of the user U as the imaging range. The image acquiring unit 40 causes the imager 28 to capture images at a regular interval. Every time the imager 28 captures an image, the image acquiring unit 40 acquires image data from the imager 28.

Based on the image captured by the imager 28, the visually recognized object identifying unit 42 identifies a type of an object present within the field of view of the user U. Regarding an operation performed by the visually recognized object identifying unit 42, the explanation is given later.

Based on the identification result by the visually recognized object identifying unit 42, that is, based on the type of the object present within the field of the view of the user U, the visual recognition count identifying unit 44 identifies a visual recognition count indicating a number of times by which the user U has looked at an object of the same type. Regarding an operation performed by the visual recognition count identifying unit 44, the explanation is given later.

Based on the visual recognition count, the display mode setting unit 46 decides on a display mode of the sub image PS. The display mode of the sub image PS implies a manner of displaying the sub image PS, and can also be called a display form. Regarding an operation performed by the display mode setting unit 46, the explanation is given later.

The output controller 48 controls the display 22 and displays images in the display 22. The output controller 48 displays the sub image PS in the display 22 in a superimposed manner onto the main image PM. Moreover, the output controller 48 displays the sub image PS based on the display mode of the sub image PS decided by the display mode setting unit 46. Since the display mode of the sub image PS is set based on the visual recognition count, it can be said that the output controller 48 displays the sub image PS based on the visual recognition count. Regarding the specific details of an operation performed by the output controller 48, the explanation is given later.

The display device 10 is configured in the manner explained above. Given below is the explanation of the operations performed in the display device 10.

Display Mode Setting Operation

Figure 4:
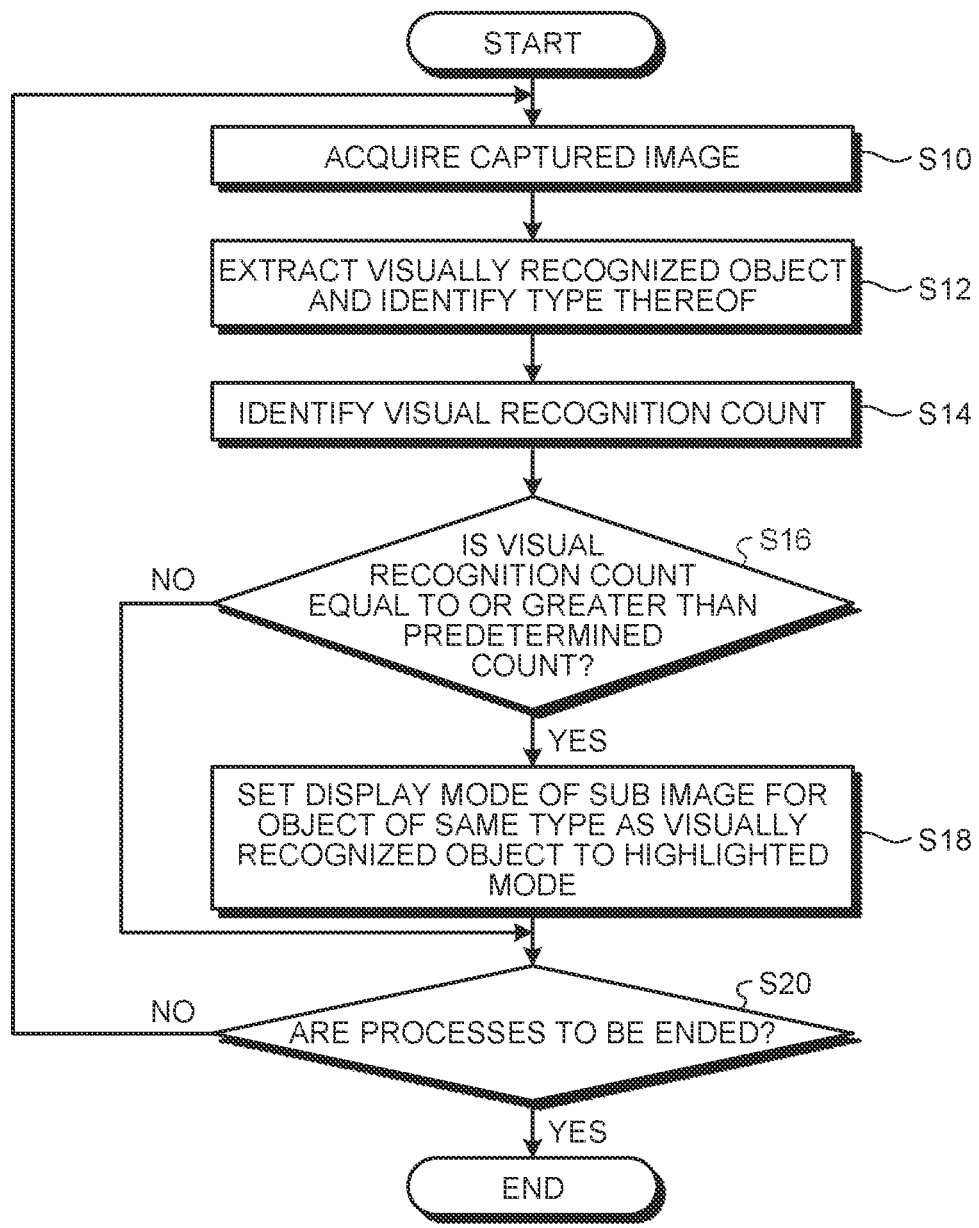
FIG. 4 is a flowchart for explaining a display mode setting process.

Firstly, as the details of the operations performed in the display device 10, the explanation is given about a display mode setting operation. FIG. 4 is a flowchart for explaining the display mode setting process.

Acquisition of Image

As illustrated in FIG. 4, in the controller 32, the image acquiring unit 40 acquires an image captured by the imager 28 (Step S10). The image acquiring unit 40 acquires an image (image data) which is captured by the imager 28 and which covers the field of view of the user U as the imaging range. That is, it can be said that the image acquiring unit 40 acquires an image that includes the main image PM within the field of the view of the user U as viewed through the display 22.

Determination of Type of Visually Recognized Object

In the controller 32, the visually recognized object identifying unit 42 extracts a visually recognized object based on the image acquired by the image acquiring unit 40, and identifies a type of the visually recognized object (Step S12). A visually recognized object implies an object that has been viewed by the user U through the display 22, and can be said to be an object present within the field of view of the user U. The visually recognized object identifying unit 42 extracts, as a visually recognized object, an object present in the image that is acquired by the image acquiring unit 40, and identifies the type of that visually recognized object. The type of the visually recognized object indicates a classification attribute of that object when classified according to a predetermined classification criterion. The classification criterion can be set in an arbitrary manner.

The visually recognized object identifying unit 42 can implement an arbitrary method to extract a visually recognized object and identify its type. For example, the object can be identified by an artificial intelligence (AI) model. In this case, the AI model is stored in the storage 24, and is meant for extracting an object which is present in an image from the image data and for identifying the type of the object. The AI model is an already-learnt AI model which is built by learning of multiple data sets as teacher data, one data set comprising image data and information indicating the type of an object present in that image. The visually recognized object identifying unit 42 inputs the image data, which is acquired by the image acquiring unit 40, to the already-learning AI model, acquires information about identification of the type of a visually recognized object present in that image, and identifies the type of the visually recognized object. Meanwhile, as the AI model, it is possible to use an arbitrary model. For example, it is possible to use a convolutional neural network (CNN) model.

Meanwhile, the visually recognized object identifying unit 42 can extract all objects present in an image acquired by the image acquiring unit 40 (i.e., all objects present within the field of view of the user U) as the visually recognized objects. However, that is not the only possible case. Alternatively, the visually recognized object identifying unit 42 can extract only some of the objects present in an image acquired by the image acquiring unit 40 (i.e., only some of the objects present within the field of view of the user U) as the visually recognized objects. In that case, for example, from among the objects present in an image acquired by the image acquiring unit 40, the visually recognized object identifying unit 42 can extract only such objects which overlap with the line of sight of the user U as the visually recognized objects. For example, the visually recognized object identifying unit 42 inputs, to the AI model, the image data of a predetermined region (for example, a central region) of the image acquired by the image acquiring unit 40, acquires the information about identification of the types of the visually recognized objects present in that predetermined region, and identifies the types of the visually recognized objects.

Moreover, for example, the visually recognized object identifying unit can extract, as a visually recognized object, an object that is continuously present within the field of view for a predetermined period or more. In that case, from chronologically-continuous images captured by the imager 28, the visually recognized object identifying unit 42 extracts, as a visually recognized object, an object that is present within the field of view for a predetermined period or more, that is, an object that is present in all of the continuous images captured for the predetermined period or more. In that case, for example, the visually recognized object identifying unit 42 inputs the image data of each of the chronologically-continuous images to the AI model, and acquires information about the type of the object present in those images. If an object classified to be of the same type is captured in all of the continuous images captured for the predetermined period or more, then the visually recognized object identifying unit 42 treats that object as the visually recognized object.

Meanwhile, the visually recognized object identifying unit 42 can acquire information about the position of the visually recognized object in the main image PM (i.e., coordinates of the visually recognized object in the image acquired by the image acquiring unit 40).

Identification of visual recognition count Subsequently, in the controller 32, based on the identification result by the visually recognized object identifying unit 42, the visual recognition count identifying unit 44 identifies a visual recognition count indicating the number of times by which the user U has looked at an object of the same type (Step S14). For each type of the visually recognized object, the visual recognition count identifying unit 44 counts, as the visual recognition count, the number of times by which the visually recognized object has been extracted by the visually recognized object identifying unit 42, and stores the visual recognition count in the storage 24. That is, the visual recognition count identifying unit 44 identifies, as the visual recognition count, the number of times by which a visually recognized object of the same type has been extracted by the visually recognized object identifying unit 42. For example, if a visually recognized object of the type "banana" is extracted five times at different timings by the visually recognized object identifying unit 42, then the visual recognition count identifying unit 44 identifies the count of five as the visual recognition count of the object of the type "banana".

Subsequently, after a predetermined period of has passed, the visual recognition count identifying unit 44 can reset the visual recognition count to zero. That is, the visual recognition count identifying unit 44 can set, as the visual recognition count, the number of times by which the visually recognized object identifying unit 42 has extracted a visually recognized object of the same type within a predetermined period. The predetermined period can be set in an arbitrary manner. For example, one month can be set, or one year can be set.

Setting of Display Mode

Based on the visual recognition count, the display mode setting unit 46 sets a display mode of the sub image PS. The sub image PS represents the information related to the object present within the field of view of the user U (i.e., the object included in the main image PM). The sub image PS is displayed when the object is present within the field of view of the user U. The display mode of the sub image PS implies a manner of displaying the sub image PS. Herein, for each type of the object, the display mode setting unit 46 sets the display mode of the sub image PS.

More specifically, for each type of the object, the display mode setting unit 46 sets the display mode of the sub image PS based on the visual recognition count. That is, the display mode setting unit 46 sets, based on the visual recognition count, the display mode of the sub image PS of the object whose type of the object is counted by the visual recognition count. For example, the display mode setting unit 46 sets the display mode of the sub image PS of the object whose type of the object is "banana" based on the visual recognition count of the visually recognized objects of the type "banana".

Figure 5:
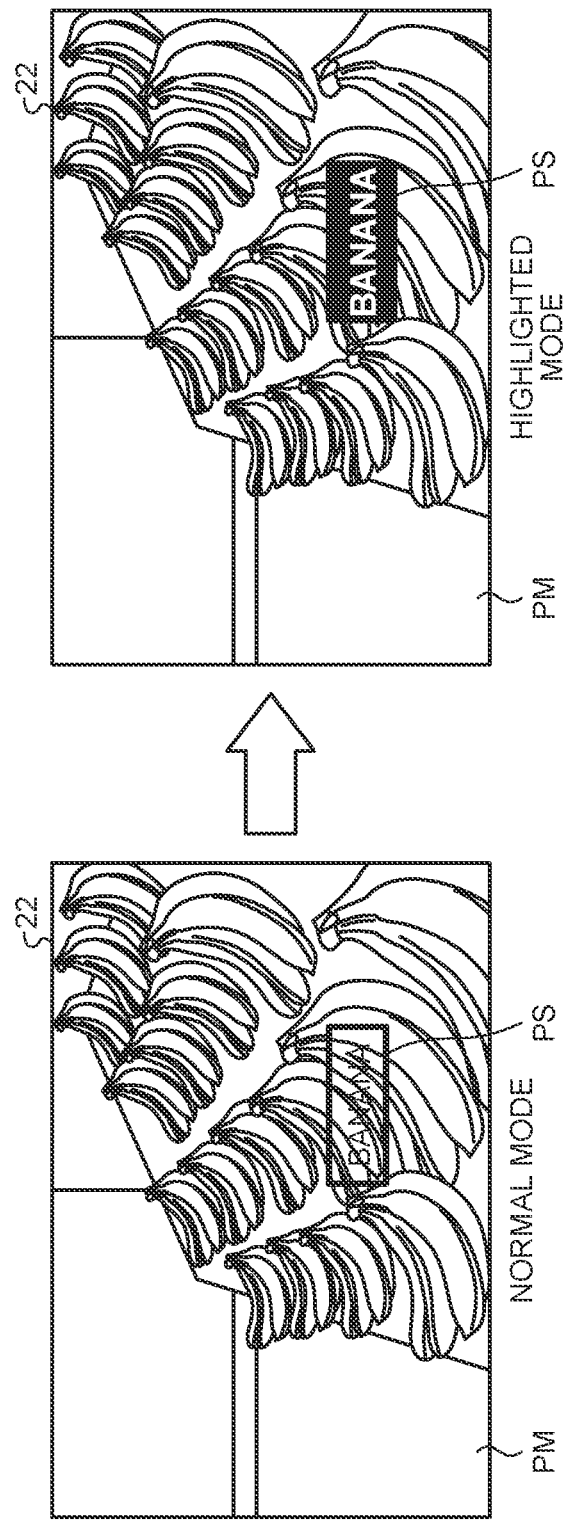
FIG. 5 is a diagram illustrating an exemplary case in which a sub image is displayed in a normal mode and a highlighted mode.
Figure 6:
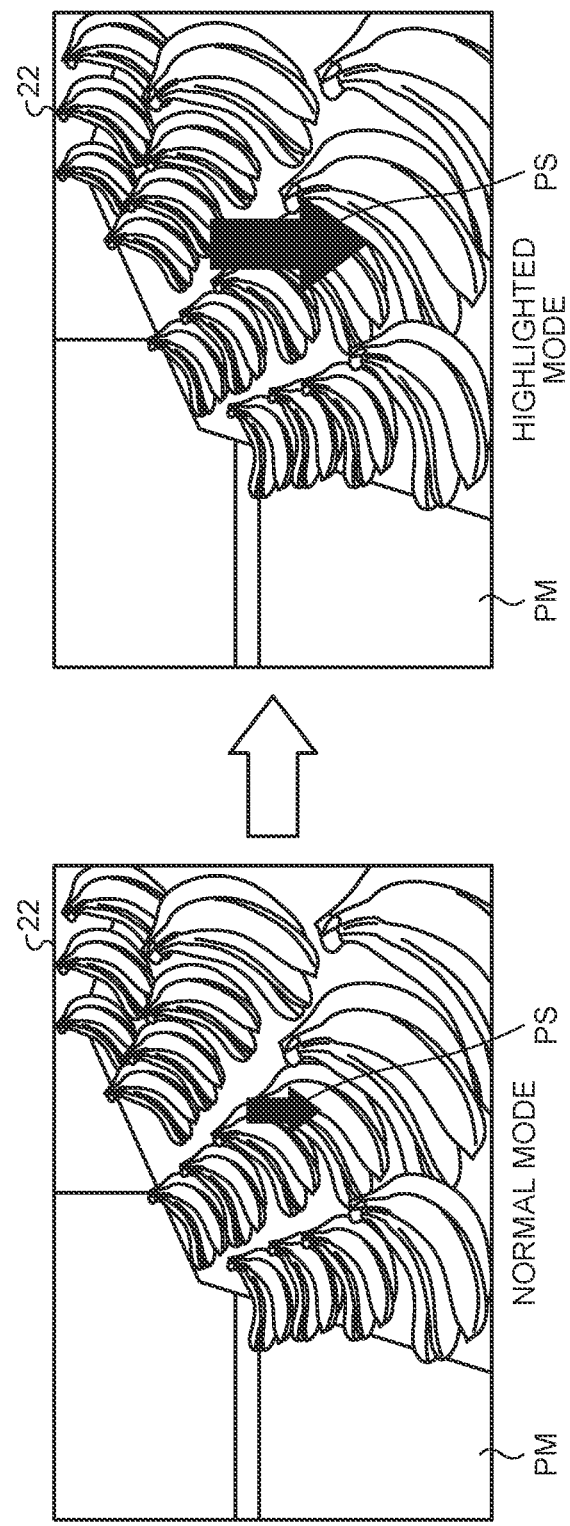
FIG. 6 is a diagram illustrating an exemplary case in which a sub image is displayed in a normal mode and a highlighted mode.

FIGS. 5 and 6 are diagrams illustrating exemplary cases in which a sub image is displayed in a normal mode and a highlighted mode. According to the visual recognition count, the display mode setting unit 46 sets the display mode of the sub image PS to the normal mode or to the highlighted mode. In the highlighted mode, the information related to the object is displayed in a more highlighted manner than in the normal mode. That is, the sub image PS that is set to have the highlighted mode is displayed to be more conspicuous than the sub image PS that is set to have the normal mode. For example, in the example illustrated in FIG. 5, when the objects of the type "banana" are present within the field of view of the user U, the characters "banana" are displayed as the sub image PS. In the example illustrated in FIG. 5, as compared to the characters "banana" displayed in the normal mode, the characters "banana" displayed in the highlighted mode are larger in size and are displayed in a more highlighted manner. In the example illustrated in FIG. 6, an arrow is displayed to point to the object of the type "banana". In the example illustrated in FIG. 6, as compared to the arrow displayed in the normal mode, the arrow displayed in the highlighted mode is larger in size and is displayed in a more highlighted manner.

Herein, the cases illustrated in FIGS. 5 and 6 are merely examples. That is, as long as the sub image PS indicates information related to an object, it can be any arbitrary image. For example, the sub image PS can be characters in an arbitrary language that indicate information related to an object, or can be an icon of an arbitrary shape such as an exclamation mark. Alternatively, for example, the sub image PS can be a text explaining about an object. In that case, in the highlighted mode, the explanation of the object can be given in a more detailed manner than in the normal mode. Still alternatively, for example, as the sub image PS, information related to the previously-extracted visually recognized object of the same type can be displayed, or comparison information about a comparison between the object being currently viewed by the user U and the previously-extracted visually recognized object of the same type can be displayed. In that case, for example, if the user U is currently looking at bananas, then information about the bananas that were previously viewed by the user U can be displayed as the sub image PS, or information comparing the bananas being currently viewed with the previously-viewed bananas can be displayed.

In the examples illustrated in FIGS. 5 and 6, the sub image PS in the highlighted mode is displayed to be larger in size than the sub image PS in the normal mode. However, that is not the only possible case. Alternatively, any arbitrary display method can be implemented for highlighting the sub image PS in the highlighted mode as compared to the sub image in the normal mode. For example, in the main image PM, a display position of the sub image PS in the highlighted mode can be placed at a more conspicuous position (for example, at the center) as compared to a display position of the sub image PS in the normal mode. Alternatively, a luminance of the sub image PS in the highlighted mode can be set at a higher level than the luminance of the sub image PS in the normal mode. Still alternatively, a display frequency of the sub image PS in the highlighted mode can be set at a higher level than a display frequency of the sub image PS in the normal mode. Herein, the display frequency can imply a display period of the sub image PS per unit time, or can imply a speed at which the sub image PS flickers.

Returning to the explanation with reference to FIG. 4, given below is the specific explanation about a display mode setting method based on the visual recognition count. As illustrated in FIG. 4, in the controller 32, the display mode setting unit 46 determines whether the visual recognition count is equal to or greater than a predetermined count (Step S16). If the visual recognition count is equal to or greater than the predetermined count (Yes at Step S16), then the display mode setting unit 46 sets the display mode of the sub image PS for the object of the same type as the visually recognized object to the highlighted mode (Step S18). On the other hand, if the visual recognition count is not equal to or greater than a predetermined count (No at Step S16), that is, if the visual recognition count is smaller than the predetermined count, then the system control proceeds to Step S20 without setting the display mode of the sub image PS of the same type as the visually recognized object to the highlighted mode. More specifically, regarding the sub image PS of the object of the same type as the visually recognized object the visual recognition count of which is smaller than a predetermined count, the display mode setting unit 46 sets the display mode to the normal mode. For example, if the visual recognition count of the visually recognized object of the type "banana" is equal to or greater than a predetermined count and if the visual recognition count of the visually recognized object of the type "apple" is smaller than the predetermined count, then the display mode setting unit 46 sets the display mode of the sub image PS of the object of the type "banana" to the highlighted mode and sets the display mode of the sub image PS of the object of the type "apple" to the normal mode.

Subsequently, if the processes are to be ended (Yes at Step S20), then the processes are ended. On the other hand, if the processes are not to be ended (No at Step S20), then the system control returns to Step S10 and the processes are performed again. At that time, if there is a visually recognized object the visual recognition count of which was previously smaller than a predetermined count but is currently equal to or greater than the predetermined count at the subsequent processes, then the display mode of the sub image PS of the object of the same type as the visually recognized object is changed from the normal mode to the highlighted mode.

In this way, when the visual recognition count is smaller than a predetermined count, the display mode setting unit 46 sets the display mode of the sub image PS to the normal mode. On the other hand, when the visual recognition count is equal to or greater than a predetermined count, the display mode setting unit 46 sets the display mode of the sub image PS to the highlighted mode. However, the processes performed by the display mode setting unit 46 are not limited to the processes explained above. Thus, the display mode of the sub image PS can be set according to an arbitrary method based on the visual recognition count. For example, if the visual recognition count is smaller than a predetermined count, then the display mode setting unit 46 can set a non-display mode in which the sub image PS is not displayed at all. Only when the visual recognition count becomes equal to or greater than the predetermined count, the display mode setting unit 46 can set a display mode for displaying the sub image PS. Alternatively, for example, the display mode setting unit 46 can set the display mode in such a way that, greater the visual recognition count, the higher a degree of highlighting of the sub image PS becomes. For example, the display mode setting unit 46 can set the size of the sub image PS in proportion to the visual recognition count.

Alternatively, for example, for each type of an object, the display mode setting unit 46 can select whether to set a non-display mode in which the sub image PS is not displayed or to set a display mode in which the sub image PS is displayed. In that case, for example, the display mode setting unit 46 acquires type information indicating the type of the object the sub image PS of which is to be displayed. Then, for objects of different types from the type specified in the acquired type information, the display mode setting unit 46 sets the non-display mode. On the other hand, for the objects of the same type specified in the type information, the display mode setting unit 46 sets a display mode in which the sub image PS is displayed. Meanwhile, the type information can alternatively indicate types of objects the sub images PS of which are not to be displayed. In that case, for objects of the types specified in the type information, the display mode setting unit 46 sets the non-display mode. Meanwhile, the type information can be set in advance. For example, the type information can be set in advance by the user U. That is, for example, if the user U is interested in fruits but has no interest in meat, a display mode is set for fruits and the non-display mode is set for meat. In this way, by setting a display mode for each type of an object, the sub image PS can be provided according to a preference of the user U.

Sub Image Display Operation

Given below is the explanation of a display process for displaying the sub image PS. The output controller 48 displays, in the display 22, the sub image PS for the visually recognized object extracted by the visually recognized object identifying unit 42 in an overlapping manner on the main image PM in which the visually recognized object is present. In other words, when a visually recognized object is present within the field of view of the user U, the output controller 48 displays the sub image PS for the visually recognized object in the display 22.

Based on the display mode set by the display mode setting unit 46, that is, based on the visual recognition count, the output controller 48 displays, in the display 22, the sub image PS for the visually recognized object extracted by the visually recognized object identifying unit 42 (i.e., the visually recognized object present within the field of view of the user U). The output controller 48 reads the display mode of the sub image PS for the visually recognized object extracted by the visually recognized object identifying unit 42, and displays, in the read display mode, the sub image PS for the extracted visually recognized object. The more specific explanation is given below.

Figure 7:
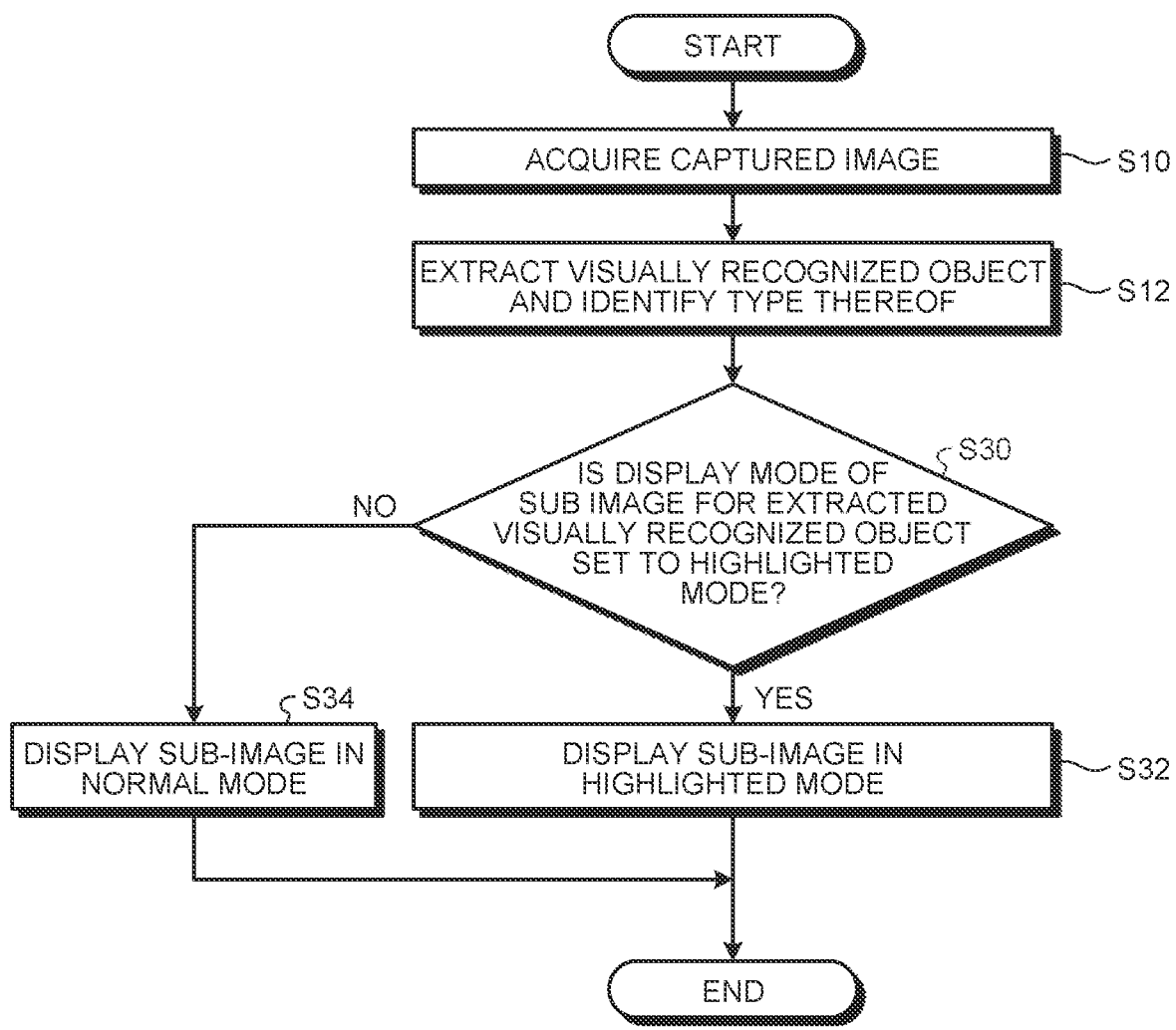
FIG. 7 is a flowchart for explaining a sub image display process.

FIG. 7 is a flowchart for explaining the sub image display process. As illustrated in FIG. 7, till Step S12 at which a visually recognized object is extracted and its type is identified, the processes are same as the processes performed in the display mode setting operation explained with reference to FIG. 4. That is, in the present embodiment, the controller 32 performs the processes from Step S14 onward illustrated in FIG. 14 (i.e., the display mode setting operation) in parallel with the operations from Step S30 onward illustrated in FIG. 7 (i.e., the display operation for displaying the sub image PS).

After a visually recognized object is extracted and its type is identified at Step S12, the output controller 48 of the controller 32 determines whether the display mode of the sub image PS for the extracted visually recognized object is set to the highlighted mode (Step S30). If the display mode of the sub image PS for the extracted visually recognized object is set to the highlighted mode (Yes at Step S30), then the output controller 48 displays the sub image PS for the visually recognized object in the highlighted mode in the display 22 (Step S32). The output controller 48 displays the sub image PS in the highlighted mode and in a superimposed manner onto the main image PM in which the visually recognized object is included. On the other hand, if the display mode of the sub image PS for the extracted visually recognized object is not set to the highlighted mode (No at Step S30), then the output controller 48 displays the sub image PS for the visually recognized object in the normal mode in the display 22 (Step S34). The output controller 48 displays the sub image PS in the normal mode and in a superimposed manner onto the main image PM in which the visually recognized object is included. That is, it can be said that the output controller 48 displays the sub image to be displayed in a more highlighted manner when the visual recognition count is equal to or greater than a predetermined count (i.e., the sub image PS set to the highlighted mode) as compared to the sub image PS to be displayed when the visual recognition count is smaller than the predetermined count (i.e., the sub image PS set to the normal mode).

For example, if the extracted visually recognized object is of the type "banana", since the sub image PS for bananas is set to the highlighted mode in the example above, the sub image PS for bananas is displayed in the highlighted mode. That is, if the user U has already looked at bananas for a number of times equal to or greater than a predetermined count, the display mode for bananas is set to the highlighted mode. Hence, when the user looks at bananas, the sub image PS for bananas is displayed in the highlighted mode. On the other hand, if the extracted visually recognized object is of the type "apple", since the sub image PS for an apple is set to the normal mode in the example above, the sub image PS for an apple is displayed in the normal mode.

As explained above, the display device 10 according to the first embodiment includes the display 22 for displaying images, the imager 28, the visually recognized object identifying unit 42, the visual recognition count identifying unit 44, and the output controller 48. The imager 28 captures images of an object present within the field of view of the user U. Based on the image captured by the imager 28, the visually recognized object identifying unit 42 identifies the type of the visually recognized object present within the field of view of the user U. Then, based on the identification result by the visually recognized object identifying unit 42, the visual recognition count identifying unit 44 identifies the visual recognition count indicating the number of times by which the user U has looked at visually recognized objects of the same type. The output controller 48 displays an image in the display 22 in a superimposed manner onto the main image PM within the field of the view of the user U as viewed through the display 22. Based on the visual recognition count, the output controller 48 displays, in the display 22, the sub image PS, which includes the information on the object of the identified type, in a superimposed manner onto the main image PM in which the object of the identified type is included.

In a display device, sometimes a display form remains uniform regardless of a user of that display device. In contrast, in the display device 10 according to the first embodiment, the number of times by which the user U has looked at the object of the same type is counted as the visual recognition count. Then, if the user U looks at an object of the same type as the abovementioned object, then, based on the visual recognition count, the sub image PS for that object is displayed. Thus, in the display device 10 according to the first embodiment, the display form of the sub image PS can be adjusted in accordance with actions in the past of the user U. That is, the display form can be appropriately adjusted in accordance with the user U.

The output controller 48 displays, in a more highlighted manner, the sub image PS to be displayed when the visual recognition count is equal to or greater than a predetermined count as compared to the sub image PS to be displayed when the visual recognition count is smaller than the predetermined count. Thus, in the display device 10 according to the first embodiment, the sub image PS for the object which has been viewed by the user U for many times is displayed in a highlighted manner. Hence, the display form can be appropriately adjusted in accordance with the user U. For example, if the user U is interested in bananas, the visual recognition count for bananas increases. In the case, since the sub image PS when the user looks at bananas is displayed in a highlighted manner, the information on bananas can be appropriately provided to the user U.

Second Embodiment

Given below is the explanation of a second embodiment. The second embodiment differs from the first embodiment in the way that the display mode of the sub image PS is set based on a visit count indicating a number of times by which the same place is visited. In the second embodiment, the configuration identical to the first embodiment is not explained again.

Configuration of Display Device

Figure 8:
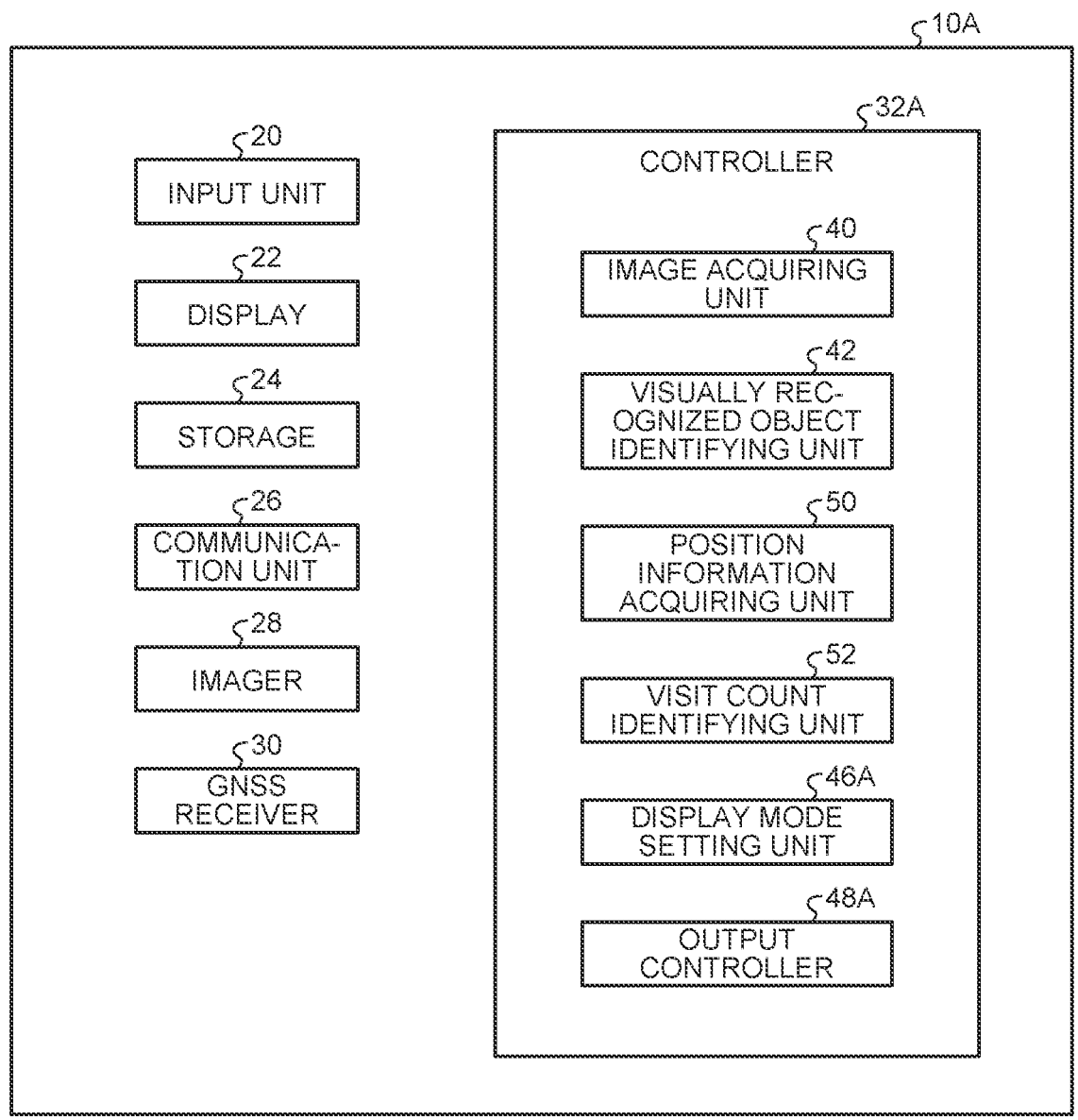
FIG. 8 is a schematic block diagram of a display device according to a second embodiment.

FIG. 8 is a schematic block diagram of a display device according to the second embodiment. As illustrated in FIG. 8, in a display device 10A according to the second embodiment, a controller 32A includes a position information acquiring unit 50, a visit count identifying unit 52, a display mode setting unit 46A, and an output controller 48A.

The position information acquiring unit 50 acquires position information of the user U (the display device 10A). The position information acquiring unit 50 causes the GNSS receiver 30 to detect the position information of the user U, and acquires a detection result about the position information of the user U from the GNSS receiver 30. Herein, the position information acquiring unit 50 causes the GNSS receiver 30 to detect the position information of the user U for each predetermined period. Every time the GNSS receiver 30 detects the position information of the user U, the position information acquiring unit 50 acquires the position information of the user U detected by the GNSS receiver 30.

Based on the position information of the user U, the visit count identifying unit 52 identifies a visit count of the user U. The visit count implies a number of times by which the user U has visited the same place. Regarding the processes by the visit count identifying unit 52, the explanation is given later.

Based on the visit count, the display mode setting unit 46A decides on the display mode of the sub image PS. Regarding the processes by the display mode setting unit 46A, the explanation is given later.

The output controller 48A displays the sub image PS based on the display mode of the sub image PS decided by the display mode setting unit 46A. Since the display mode of the sub image PS is set based on the visit count, it can be said that the output controller 48A displays the sub image PS based on the visit count. Regarding the processes by the output controller 48A, the explanation is given later.

Display Mode Setting Operation

Figure 9:
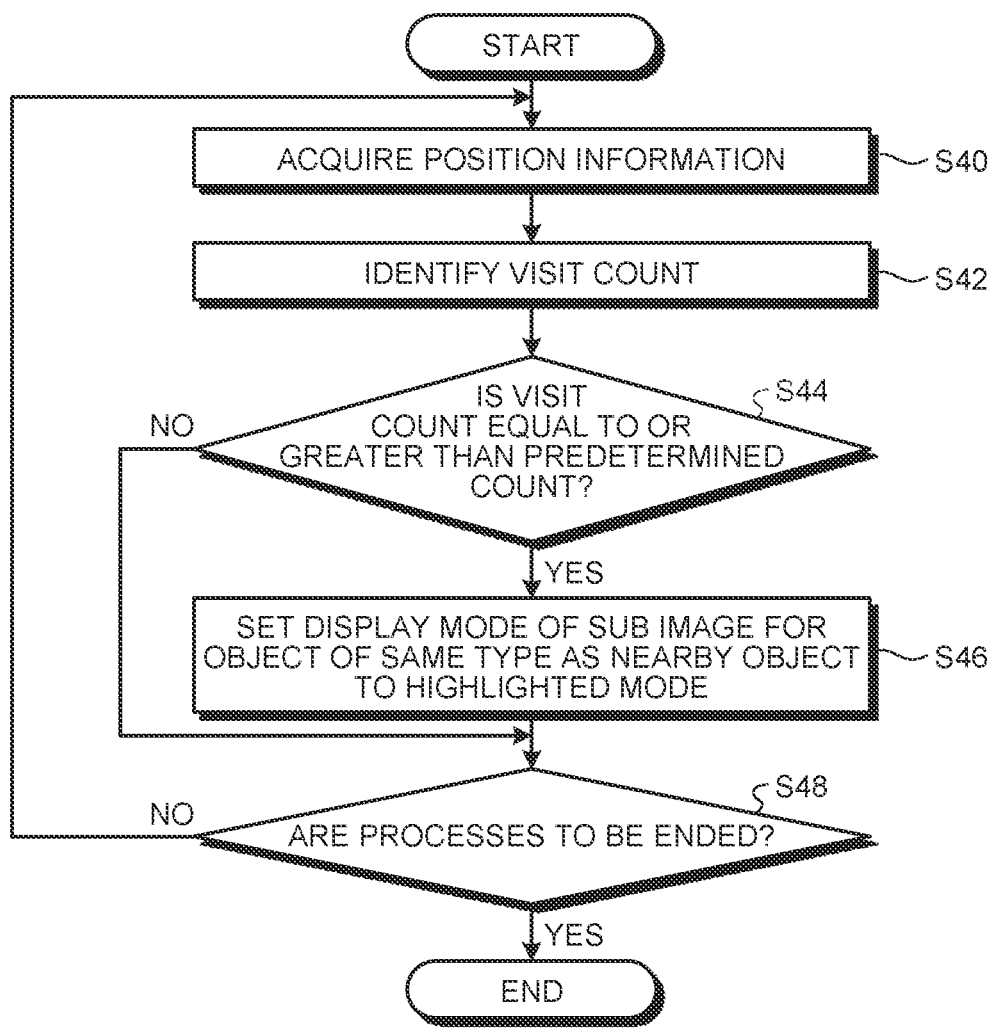
FIG. 9 is a flowchart for explaining a display mode setting process.

FIG. 9 is a flowchart for explaining a display mode setting process.

Acquisition of Position Information

As illustrated in FIG. 9, in the controller 32A, the position information acquiring unit 50 acquires the position information of the user U (Step S40).

Identification of Visit Count

In the controller 32A, based on the position information of the user U, the visit count identifying unit 52 identifies the visit count indicating the number of times by which the user U has visited the same place (Step S42). The visit count identifying unit 52 identifies a visited place based on the position information of the user U, counts the number of times by which the user U has visited the visited place for each visited place, and stores that count as the visit count in the storage 24. In the second embodiment, a place implies a region having a predetermined area in the terrestrial coordinate system. For example, the visit count identifying unit 52 divides the terrestrial coordinate system into multiple regions (places) and determines a region (place) which includes the position of the user U as a visiting place. Then, for each region (place), the visit count identifying unit 52 counts the number of times by which the region was determined as the visiting place, and treats that count as the visit count. For example, if the total number of times by which the position of the user U detected at different timings is placed within a region AR1 is equal to five, then the visit count identifying unit 52 sets the visit count to five for the region AR1.

More specifically, when the user U is continuously present within the same region for a predetermined period or more, the visit count identifying unit 52 can treat that region as a visiting place. That is, when the user U remains in the same region for a predetermined period or more, the visit count identifying unit 52 can determine that the user U has visited that region. In that case, based on sets of the position information of the user U detected continuously along time series for a predetermined time, if the position indicated by each set of the position information of the user U is placed within the same region, then the visit count identifying unit 52 treats that region as a visited place.

However, the visit count identifying unit 52 is not limited to count the visit count by dividing the terrestrial coordinate system into multiple regions. Alternatively, for example, the visit count identifying unit 52 can compare the positions of the user U detected at different timings and, if those positions are placed within a predetermined distance range, can determine that the user U has visited the same place, and accordingly count the visit count.

Subsequently, after a predetermined period has passed, the visit count identifying unit 52 can reset the visit count to zero. That is, the visit count identifying unit 52 can treat the number of times by which the user U visited the same place within a predetermined period as the visit count. The predetermined period can be set in an arbitrary manner. For example, one month can be set, or one year can be set.

Setting of Display Mode

The display mode setting unit 46A sets the display mode of the sub image PS based on the visit count. The display mode setting unit 46A extracts, as a nearby object, a particular object that is present within a predetermined distance range from the place for which the visit count is identified. For example, the display mode setting unit 46A reads map data from the storage 24 and, based on the map data, extracts, as a nearby object, a particular object present within a predetermined distance range from the place for which the visit count is identified. Then, based on the visit count, the display mode setting unit 46A sets the display mode of the sub image PS for an object of the same type as the nearby object. For example, if the region AR1 represents the place for which the visit count is identified, then the display mode setting unit 46A reads, from the map data, a particular facility that is present within a predetermined distance range from the region AR1 and treats the read facility as the nearby object. Subsequently, the display mode setting unit 46A sets the display mode of the sub image PS for the facility of the same type as the facility treated as the nearby object based on the visit count for the region AR1.

More specifically, as illustrated in FIG. 9, in the controller 32A, the display mode setting unit 46A determines whether or not the visit count is equal to or greater than a predetermined count (Step S44). If the visit count is equal to or greater than a predetermined count (Yes at Step S44), then the display mode setting unit 46A extracts a nearby object present within a predetermined distance range from the place for which the visit count is equal to or greater than the predetermined count. Then, the display mode setting unit 46A sets the display mode of the sub image PS for the object of the same type as the nearby object to the highlighted mode (Step S46). On the other hand, if the visit count is not equal to or greater than a predetermined count (No at Step S44), that is, if the visit count is smaller than a predetermined count, then the system control proceeds to Step S48 without setting the display mode of the sub image PS to the highlighted mode. More specifically, firstly, the display mode setting unit 46A sets the display mode of the sub images PS for all types of the objects to the normal mode. Then, regarding the places for which the visit count is smaller than the predetermined count, the display mode setting unit 46A neither extracts any nearby object nor sets the display mode. When there is a place for which the visit count is equal to or greater than a predetermined count, the display mode setting unit 46A extracts a nearby object from that place and changes the display mode of the object of the same type as the nearby object to the highlighted mode.

Subsequently, if the processes are to be ended (Yes at Step S48), then the processes are ended. On the other hand, if the processes are not to be ended (No at Step S48), then the system control returns to Step S40 and the processes are performed again.

Sub Image Display Operation

Based on the display mode set by the display mode setting unit 46A, that is, based on the visit count, the output controller 48A displays, in the display 22, the sub image PS for the visually recognized object extracted by the visually recognized object identifying unit 42 (i.e., the visually recognized object present within the field of view of the user U). The output controller 48 reads the display mode of the sub image PS for the visually recognized object extracted by the visually recognized object identifying unit 42, and displays the sub image PS for the extracted visually recognized object in the read display mode. The more specific explanation is given below.

Figure 10:
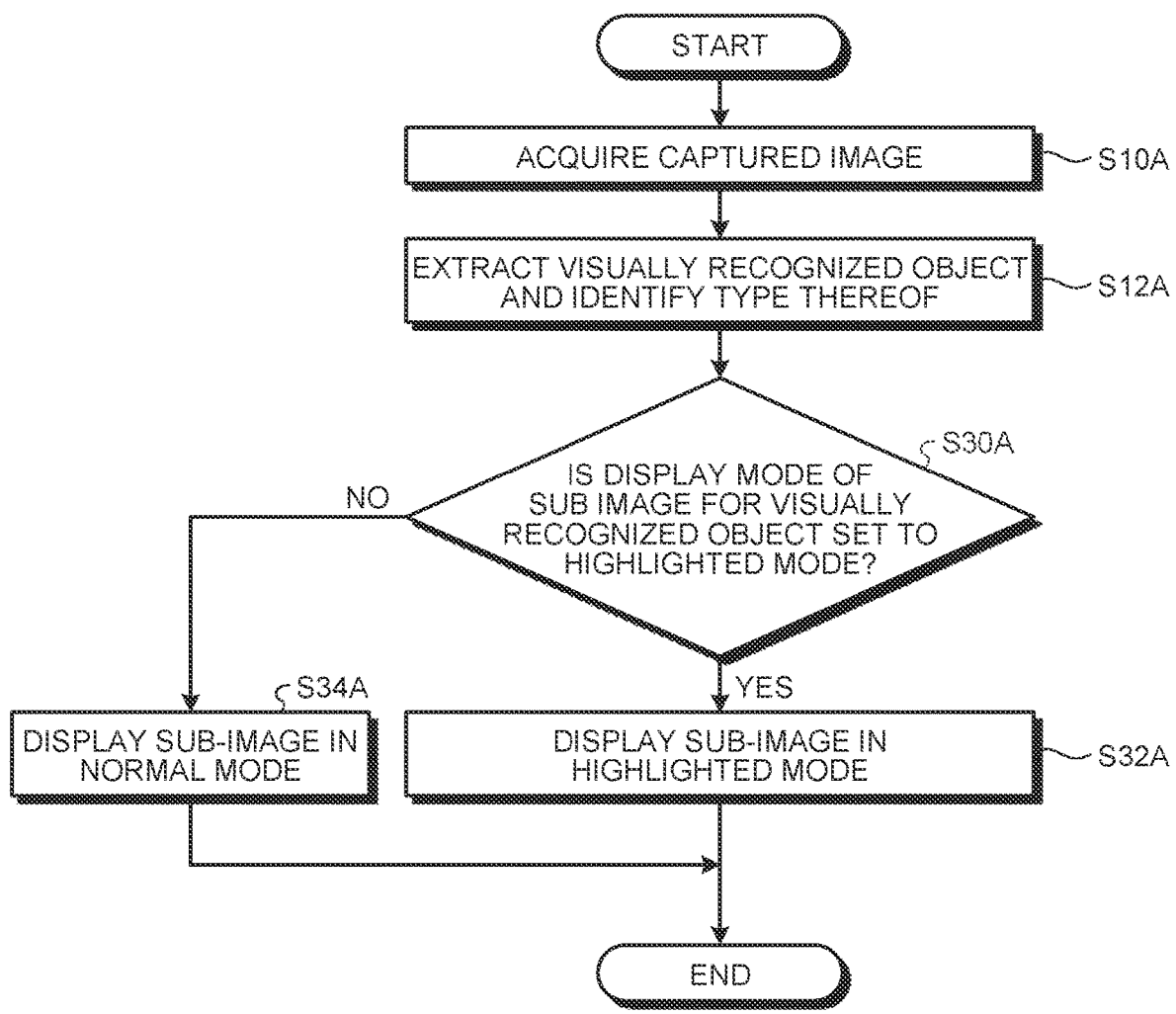
FIG. 10 is a flowchart for explaining a sub image display process.

FIG. 10 is a flowchart for explaining a sub image display process. As illustrated in FIG. 10, in the controller 32A, the image acquiring unit 40 acquires an image captured by the imager 28 (Step S10A), and the visually recognized object identifying unit 42 extracts a visually recognized object based on the image acquired by the image acquiring unit 40 and identifies the type of the visually recognized object (Step S12A). Then, in the controller 32A, the output controller 48A determines whether the display mode of the sub image PS for the extracted visually recognized object is set to the highlighted mode (Step S30A). If the display mode of the sub image PS for the extracted visually recognized object is set to the highlighted mode (Yes at Step S30A), then the output controller 48 displays the sub image PS for the visually recognized object in the highlighted mode in the display 22 (Step S32A). Herein, the output controller 48A displays the sub image PS in the highlighted mode and in a superimposed manner onto the main image PM in which the visually recognized object is included. On the other hand, if the display mode of the sub image PS for the extracted visually recognized object is not set to the highlighted mode (No at Step S30A), that is, if the display mode of the sub image is set to the normal mode, then the output controller 48 displays the sub image PS for the visually recognized object in the normal mode in the display 22 (Step S34A). Herein, the output controller 48A displays the sub image PS in the normal mode and in a superimposed manner onto the main image PM in which the visually recognized object is included. That is, it can be said that, the output controller 48A displays, in a more highlighted manner, the sub image to be displayed when the visit count is equal to or greater than a predetermined count (i.e., the sub image PS set to the highlighted mode) as compared to the sub image PS to be displayed when the visit count is smaller than the predetermined count (i.e., the sub image PS set to the normal mode).

In this way, when the display mode for the object viewed by the user U is set to the highlighted mode, the output controller 48A displays the sub image PS for the object in the highlighted mode. Thus, when the user U visits again a place for which the visit count is equal to or greater than the predetermined count and looks at a nearby object of that place, the sub image PS for that nearby object is displayed in the highlighted mode. Moreover, also when the user U visits a place different from the place for which the visit count is equal to or greater than the predetermined count and looks at an object that is different from the nearby object of the place for which the visit count is equal to or greater than the predetermined count but that is of the same type as the nearby object, the sub image PS for the viewed object is displayed in the highlighted mode. As a specific example, assume that the visit count for the region AR1 is equal to greater than a predetermined count and that a nearby object with respect to the region AR1 is a pharmacy. In that case, not only when the user visits again the region AR1 and looks at the same pharmacy which is the nearby object but also when the user looks at a different pharmacy at a different place other than the region AR1, the sub image PS for a pharmacy is displayed in the highlighted mode.

Figure 11:
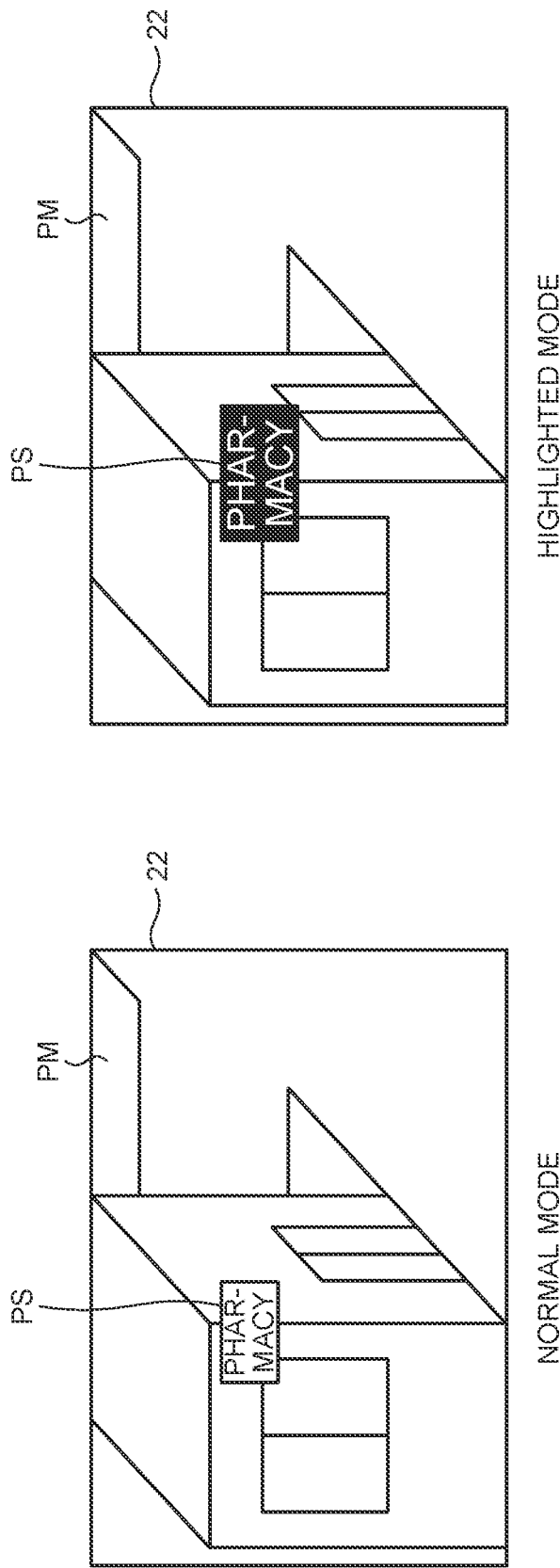
FIG. 11 is a diagram illustrating an exemplary case in which a sub image is displayed in a normal mode and a highlighted mode.

FIG. 11 is a diagram illustrating an exemplary case in which a sub image is displayed in a normal mode and a highlighted mode. In the example illustrated in FIG. 11, when an object of the type "pharmacy" is present within the field of view of the user U, the characters "pharmacy" are displayed as the sub image PS. In the example illustrated in FIG. 11, as compared to the characters "pharmacy" displayed in the normal mode, the characters "pharmacy" displayed in the highlighted mode are larger in size and are displayed in a more highlighted manner. However, the case illustrated in FIG. 11 is merely an example. That is, as long as the sub image PS indicates information related to an object, it can be any arbitrary image. For example, the sub image PS can be characters in an arbitrary language that indicate the information related to the object, or can be an icon of an arbitrary shape such as an exclamation mark or an arrow mark. Alternatively, for example, the sub image PS can be a text explaining about the object. In that case, in the highlighted mode, the explanation of the object can be given in a more detailed manner than in the normal mode. Still alternatively, for example, as the sub image PS, the information for the previously-extracted visually recognized object of the same type can be displayed, or comparison information about a comparison between the object being currently viewed by the user U and the previously-extracted nearby object of the same type can be displayed. In that case, for example, if the user U is currently looking at a pharmacy, the information about the pharmacy that was previously visited by the user U can be displayed as the sub image PS, or information comparing the pharmacy being currently viewed with the previously-visited pharmacy can be displayed.

In the example illustrated in FIG. 11, the sub image PS in the highlighted mode is displayed to be larger in size than the sub image PS in the normal mode. However, that is not the only possible case. Alternatively, any arbitrary display method can be implemented for highlighting the sub image PS in the highlighted mode as compared to the sub image in the normal mode. For example, in the main image PM, the display position of the sub image PS in the highlighted mode can be placed at a more conspicuous position (for example, at the center) as compared to the display position of the sub image PS in the normal mode. Alternatively, a luminance of the sub image PS in the highlighted mode can be set at a higher level than a luminance of the sub image PS in the normal mode. Still alternatively, a display frequency of the sub image PS in the highlighted mode can be set at a higher level than a display frequency of the sub image PS in the normal mode. Herein, the display frequency either can imply a display period of the sub image PS per unit time, or can imply a speed at which the sub image PS flickers.

In the second embodiment, the sub image PS is set to have the normal mode when the visit count is smaller than a predetermined count and is set to have the highlighted mode when the visit count is equal to or greater than a predetermined count. However, the display mode setting method according to the second embodiment is not limited to the explanation given above. Alternatively, the display mode of the sub image PS can be set according to an arbitrary method based on the visit count. For example, if the visit count is smaller than a predetermined count, then the display mode setting unit 46A can set a non-display mode in which the sub image PS is not displayed at all. Only when the visit count becomes equal to or greater than a predetermined count, the display mode setting unit 46A can set the display mode in which the sub image PS is displayed. Alternatively, for example, the display mode setting unit 46A can set the display mode in such a way that, greater the visit count, the higher a degree of highlighting of the sub image PS becomes. For example, the display mode setting unit 46A can set the size of the sub image PS in proportion to the visit count.

As explained above, the display device 10A according to the second embodiments includes the display 22 for displaying images, the position information acquiring unit 50, the visit count identifying unit 52, and the output controller 48A. The position information acquiring unit 50 acquires the position information of the user U. Based on the position information of the user U, the visit count identifying unit 52 identifies the visit count indicating the number of times by which the user U has visited the same place. The output controller 48A displays, in the display 22, a sub image PS in a superimposed manner onto the main image PM within the field of the view of the user U viewed through the display 22. Herein, based on the visit count, the output controller 48A displays, in the display 22, the sub image PS including information about an object of the same type as an object present within a predetermined distance range from the place visited by the user U (i.e., a nearby object).

In a display device, sometimes a display form remains uniform regardless of a user of that display device. In contrast, in the display device 10A according to the second embodiment, the number of times by which the user U has visited the same place is counted as the visit count. Then, if the user U looks at an object of the same type as a nearby object present near the visited place, then, based on the visit count, the display device 10A displays the sub image PS for the viewed object. Thus, in the display device 10A according to the second embodiment, the display form of the sub image PS can be adjusted in accordance with actions in the past of the user U. That is, the display form of the sub image PS can be appropriately adjusted in accordance with the user U. That is, the display form can be appropriately adjusted in accordance with the user U.

The output controller 48A displays, in a more highlighted manner, the sub image PS to be displayed when the visit count is equal to or greater than a predetermined count as compared to the sub image PS to be displayed when the visit count is smaller than the predetermined count. Thus, in the display device 10A according to the second embodiment, for an object of the same type as the nearby object of the place for which the visit count is large, the sub image PS is displayed in a highlighted manner. Hence, in the display device 10A, the display form can be appropriately adjusted in accordance with actions of the user U.

Meanwhile, also when an object of the same type as the nearby object enters the field of view of the user U at a place different from the place for which the visit count is equal to or greater than a predetermined count, the output controller 48A displays the sub image PS for the viewed object in a highlighted manner. As a result, for example, even at a place visited by the user U for the first time, objects of interest to the user U can be easily made recognizable, and the display form can be appropriately adjusted in accordance with actions of the user U.

When the user U remains at the same position for a predetermined period or more, the visit count identifying unit 52 determines that the user U has visited that place. With that, the display form can be adjusted in accordance with actions of the user U.

Meanwhile, it is also possible to combine the second embodiment with the first embodiment. That is, the sub image PS can be displayed based on the visual recognition count by the processes according to the first embodiment as well as based on the visit count by the processes according to the second embodiment.

Third Embodiment

Given below is the explanation of a third embodiment. The third embodiment differs from the first and second embodiments in the way that the display mode of the sub image PS is set based on the number of times by which the user U has looked at the object of the same type at the same place. In the third embodiment, the configuration identical to the first and second embodiments is not explained again.

Configuration of Display Device

Figure 12:
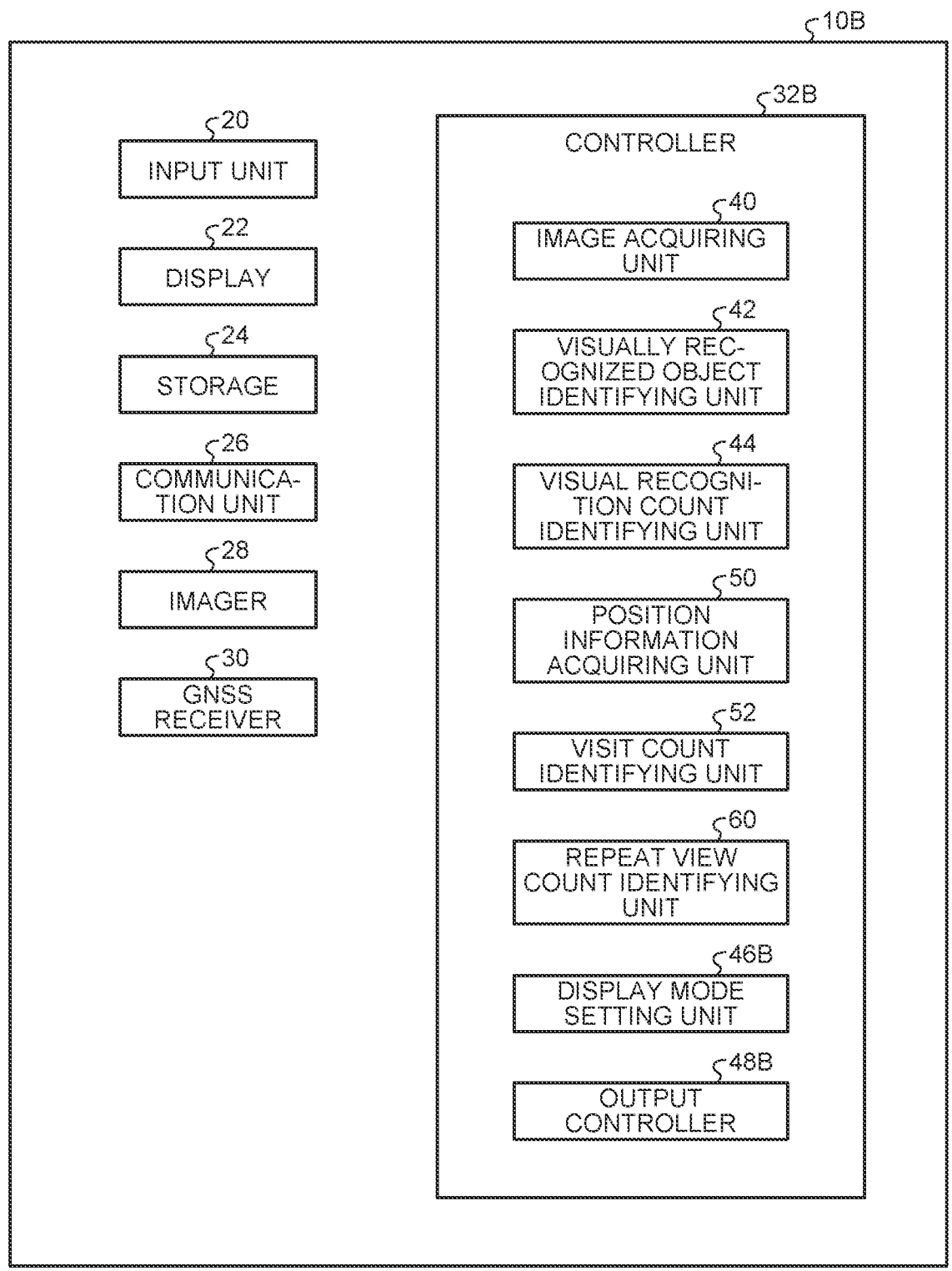
FIG. 12 is a schematic block diagram of a display device according to a third embodiment.

FIG. 12 is a schematic block diagram of a display device according to the third embodiment. As illustrated in FIG. 12, in a display device 10B according to the third embodiment, a controller 32B includes the image acquiring unit 40, the visually recognized object identifying unit 42, the visual recognition count identifying unit 44, the position information acquiring unit 50, a repeat view count identifying unit 60, a display mode setting unit 46B, and an output controller 48B.

The repeat view count identifying unit 60 identifies a repeat view count indicating the number of times by which the user U has looked at the object of the same type at the same place. Regarding the processes by the repeat view count identifying unit 60, the explanation is given later.

Display Mode Setting Process

The controller 32B according to the third embodiment implements an identical method according to the first embodiment and sets the display mode of the sub image PS based on the visual recognition count, and implements an identical method to the second embodiment and sets the display mode of the sub image PS based on the visit count. However, the third embodiment differs from the first and second embodiments in that the controller 32B sets the display mode of the sub image PS also based on the repeat view count. The following explanation is given about a display mode setting operation performed based on the repeat view count.

Figure 13:
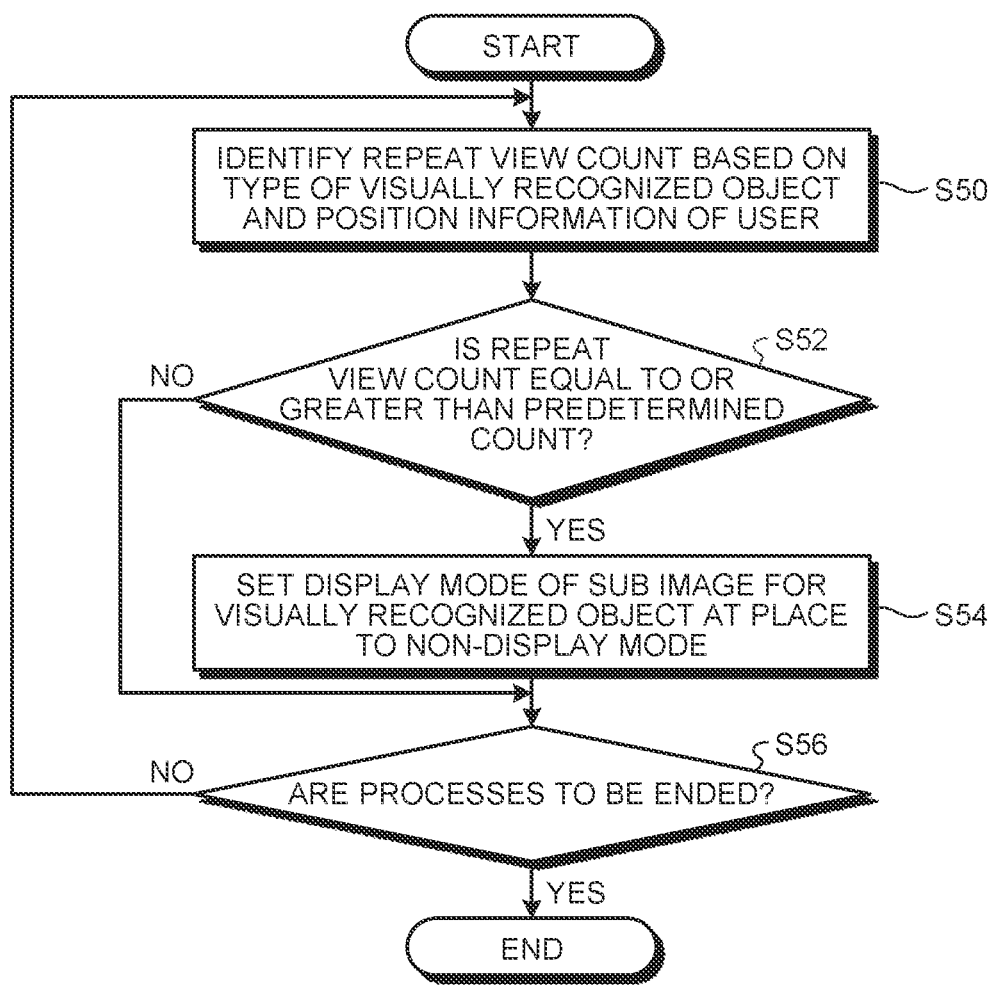
FIG. 13 is a flowchart for explaining a display mode setting process.

FIG. 13 is a flowchart for explaining the display mode setting operation. As illustrated in FIG. 13, in the controller 32B, the repeat view count identifying unit 60 identifies a repeat view count based on the type of the visually recognized object identified by the visually recognized object identifying unit 42 and the position information of the user U acquired by the position information acquiring unit 50 (Step S50). More particularly, the repeat view count identifying unit 60 treats, as a single dataset, the information about the type of the visually recognized object identified by the visually recognized object identifying unit 42 and the position information of the user U at a timing of capturing the image which has been used for identifying the type of the visually recognized object; and acquires such a dataset for each timing of capturing the image. Then, for example, the repeat view count identifying unit 60 sorts such datasets for each combination of the types of the visually recognized object and the position of the user U, and counts, as the repeat view count, the number of the dataset including the object of the same type and including the same place at which the user U is present. Thus, for each combination of the type of the visually recognized object and the place at which the user U is present, the repeat view count identifying unit 60 counts the repeat view count. That is, for example, if the user U has looked at the pharmacy in the region AR1 for five times, then the repeat view count for the pharmacy in the region AR1 is counted to be five.

Subsequently, after a predetermined period has passed, the repeat view count identifying unit 60 can reset the repeat view count to zero. That is, the repeat view count identifying unit 60 can set, as the repeat view count, the number of times by which the user U has looked at the same object at the same place within a predetermined period. The predetermined period can be set in an arbitrary manner. For example, one month can be set, or one year can be set.

Based on the repeat view count, the display mode setting unit 46B sets the display mode of the sub image PS. Thus, based on the repeat view count, the display mode setting unit 46B sets the display mode for the visually recognized object that was viewed at the place at which the repeat view count has been counted based on the repeat view count. More particularly, as illustrated in FIG. 13, the display mode setting unit 46B determines whether the repeat view count is equal to or greater than a predetermined count (Step S52). If the repeat view count is equal to or greater than a predetermined count (Yes at Step S52), then the display mode setting unit 46B sets the display mode of the sub image PS for the visually recognized object at the place at which the repeat view count is equal to or greater than a predetermined count (Step S54) to the non-display mode. For example, if the repeat view count indicating that the number of times by which the pharmacy is viewed in the region AR1 is equal to or greater than a predetermined count, then the display mode for the pharmacy in the region AR1 is set to the non-display mode.

On the other hand, if the repeat view count is not equal to or greater than a predetermined count (No at Step S52), that is, if the repeat view count is smaller than a predetermined count, then the system control proceeds to Step S56 without setting the display mode to the non-display mode. Subsequently, if the processes are to be ended (Yes at Step S56), then the processes are ended. On the other hand, if the processes are not to be ended (No at Step S56), then the system control returns to Step S50 and the processes are performed again.

Meanwhile, after a predetermined period has passed since the display mode was set to the non-display mode, the display mode setting unit 46B may discontinue the non-display mode and switch to a display mode in which the sub image PS is displayed.

Sub Image Display Operation

Figure 14:
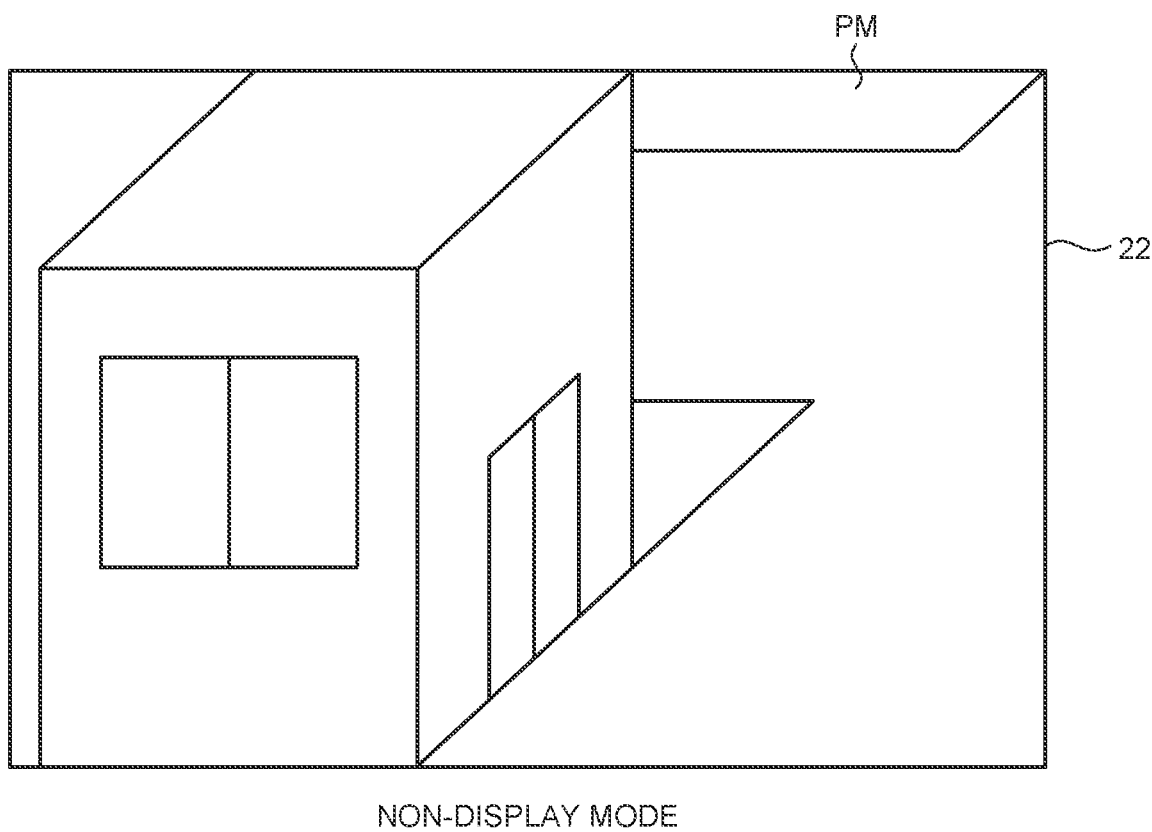
FIG. 14 is a diagram illustrating an exemplary case of a non-display mode.

FIG. 14 is a diagram illustrating an exemplary case in which the non-display mode is set. Based on the display mode set by the display mode setting unit 46B, the output controller 48B displays, in the display 22, the sub image PS for the visually recognized object extracted by the visually recognized object identifying unit 42 (i.e., the visually recognized object present within the field of view of the user U). For example, in an identical manner to the first embodiment and the second embodiment, when the sub image PS for the extracted visually recognized object is set to have the highlighted mode, the output controller 48B displays the sub image PS in the highlighted mode. On the other hand, when the sub image PS for the extracted visually recognized object is set to have the normal mode, the output controller 48B displays the sub image PS in the normal mode. Moreover, when the sub image PS for the extracted visually recognized object is set to have the non-display mode, the output controller 48B does not display the sub image PS for the visually recognized object. In that case, it can be said that, the output controller 48B acquires the position information of the user U when the user U has looked at the extracted visually recognized object, and if the position of the user U when the user U has looked at the extracted visually recognized object is placed in the same place for which the repeat view count has become equal to or greater than a predetermined count and if the type of the visually recognized object matches with the type of the nearby object of the place for which the repeat view count has become equal to or greater than a predetermined count, the sub image PS for the visually recognized object is not displayed. In FIG. 14 is illustrated an exemplary case in which the non-display mode is set. As illustrated in FIG. 14, when the non-display mode is set, the sub image PS is not displayed.

As explained above, the display device 10B according to the third embodiment includes the repeat view count identifying unit 60. The repeat view count identifying unit 60 identifies the repeat view count indicating the number of times by which the user U has viewed the object of the same type at the same place, based on the identification result by the visually recognized object identifying unit 42 and the position information of the user U. If the repeat view count is equal to or greater than a predetermined count, then the output controller 48B stops displaying the sub image PS for the object. Herein, generally, the user U has a routine of an action pattern on weekly basis. Hence, it can be assumed that the user U may look at the same object or visit the same place with no interest. In such a case, if the sub image PS for the object is displayed, then it can become troublesome to the user U. In contrast, in the display device 10B according to the third embodiment, when the repeat view count becomes equal to or greater than a predetermined count, the display of the sub image PS for the object is stopped. Hence, in the display device 10B according to the third embodiment, it becomes possible to suppress a situation in which the user U feel troublesome, and to appropriately adjust the display form according to actions of the user U.

Meanwhile, in the explanation given above, the non-display mode is set for the sub image PS for the visually recognized object present at the place for which the repeat view count has become equal to or greater than a predetermined count. On the other hand, the non-display mode is not set for the sub image PS for an object of the same type present in a different place from the abovementioned place. However, that is not the only possible case. Alternatively, the non-display mode can be set for the sub image PS for an object of the same type present in a different place. That is, the display device 10B can set the non-display mode for the sub image for an object of the same type as the nearby object in the place for which the repeat view count has become equal to or greater than a predetermined count. For example, if the repeat view count for the pharmacy present in the region AR1 is equal to or greater than a predetermined count, then the non-display mode can be set also for the sub image PS for a pharmacy at a place other than the region AR1.

Moreover, in the explanation given above, the display device 10B sets the display mode based on the visual recognition count and the visit count as well as based on the repeat view count. However, that is not the only possible case. Alternatively, for example, instead of setting the display mode based on the visual recognition count and the visit count, the display device 10B can set the display mode based on only the repeat view count.

Fourth Embodiment

Given below is the explanation of a fourth embodiment. The fourth embodiment differs from the first embodiment in the way that the display mode of the sub image PS is set based on the number of times by which the user U looks away from the object. In the fourth embodiment, the configuration identical to the first embodiment is not explained again. Meanwhile, the fourth embodiment can be combined with the second embodiment or the third embodiment.

Configuration of Display Device

Figure 15:
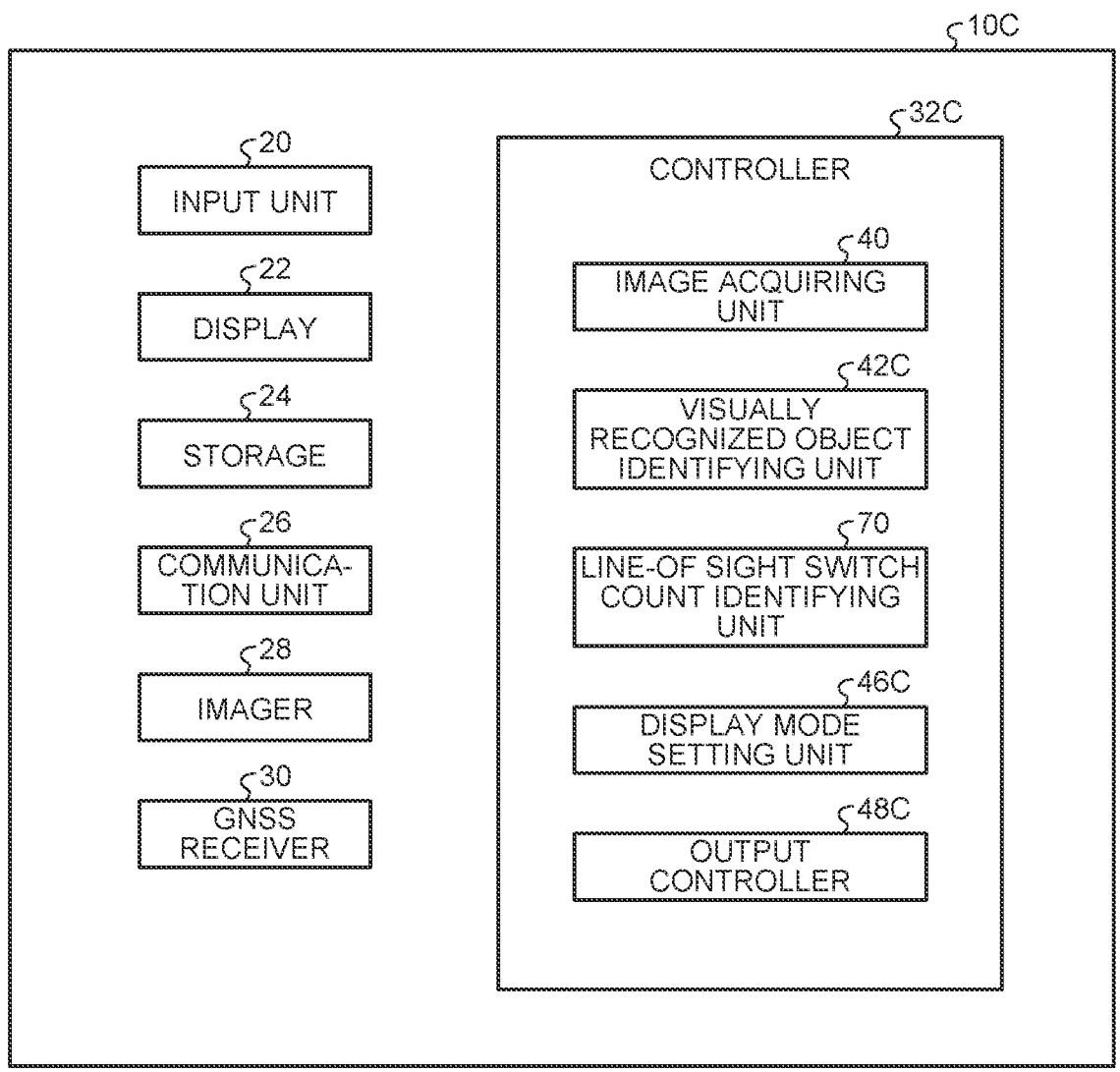
FIG. 15 is schematic block diagram of a display device according to a fourth embodiment.

FIG. 15 is schematic block diagram of a display device according to the fourth embodiment. As illustrated in FIG. 15, in the display device 10C according to the fourth embodiment, a controller 32C includes the image acquiring unit 40, a visually recognized object identifying unit 42C, a line-of-sight switch count identifying unit 70, a display mode setting unit 46C, and an output controller 48C.

Based on an image captured by the imager 28, the visually recognized object identifying unit 42C identifies the type of the object from which the user U looked away within a predetermined period. Regarding the processes performed by the visually recognized object identifying unit 42C, the explanation is given later.

Based on the identification result by the visually recognized object identifying unit 42C, the line-of-sight switch count identifying unit 70 identifies a line-of-sight switch count indicating the number of times by which the user U looked away from the object of the same type. Regarding the processes by the line-of-sight switch count identifying unit 70, the explanation is given later.

Display Mode Setting Process

The controller 32C according to the fourth embodiment sets the display mode of the sub image PS based on the line-of-sight switch count. Meanwhile, in the fourth embodiment too, the display mode can be set based on the visual recognition count in an identical manner to the first embodiment, or can be set based on the visit count in an identical manner to the second embodiment, or can be set based on the repeat view count in an identical manner to the third embodiment.

Figure 16:
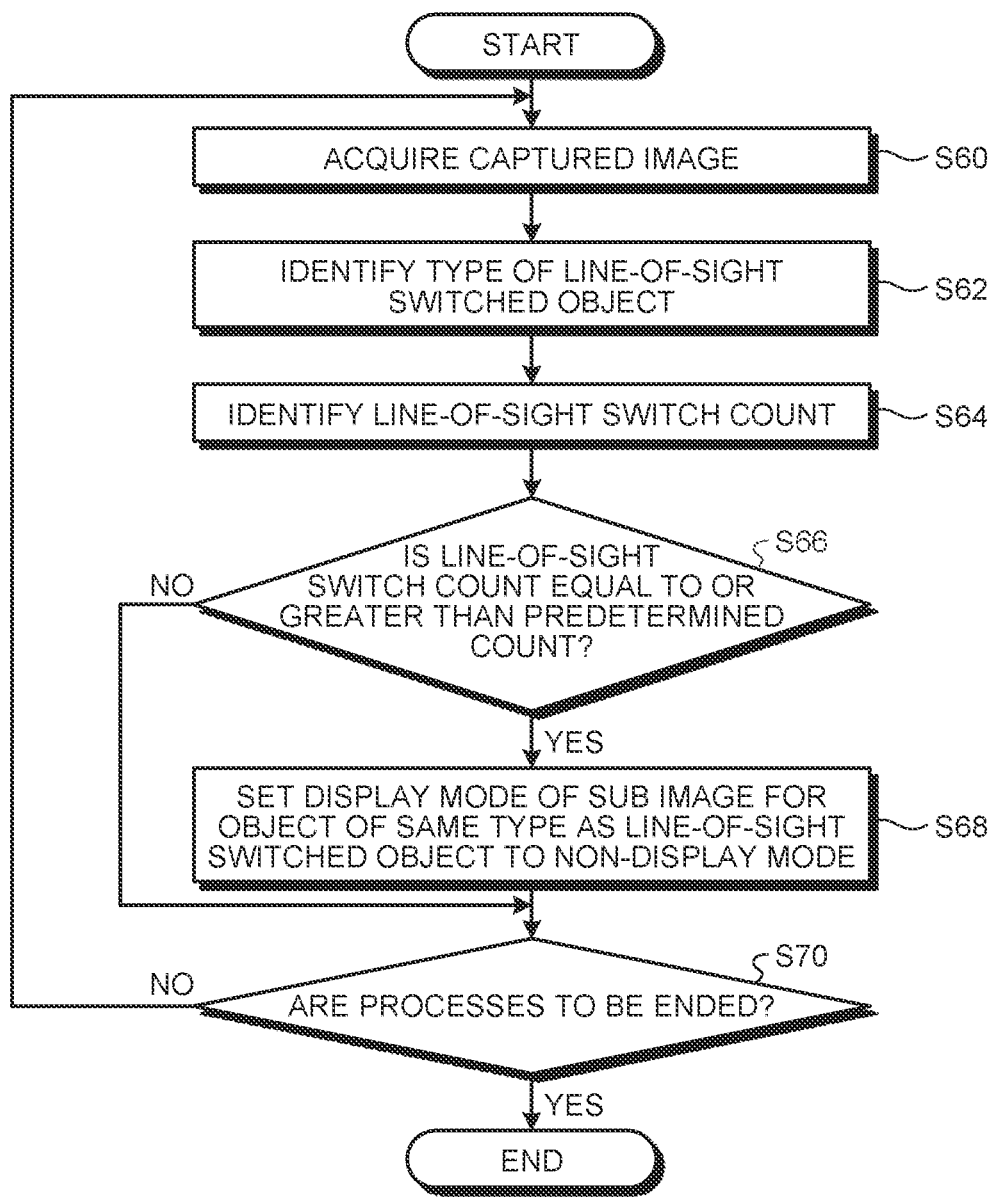
FIG. 16 is a flowchart for explaining a display mode setting process.

FIG. 16 is a flowchart for explaining a display mode setting process. As illustrated in FIG. 16, in the controller 32C, the image acquiring unit 40 acquires an image captured by the imager 28 (Step S60), and the visually recognized object identifying unit 42C identifies the type of a line-of-sight switched object based on the image acquired by the image acquiring unit 40 (Step S62). A line-of-sight switched object implies an object from which the user U looked away within a predetermined period.

The visually recognized object identifying unit 42C extracts a line-of-sight switched object based on the image data of the chronologically-continuous images, and identifies the type of the line-of-sight switched object. More particularly, the visually recognized object identifying unit 42C extracts, as a line-of-sight switched object, an object that has come into the field of view and then went out thereof within a predetermined period. That is, the visually recognized object identifying unit 42C extracts, as a line-of-sight switched object, an object that has been present in the image captured at a certain time but was not present in the image captured within a predetermined time from the certain time. However, the visually recognized object identifying unit 42C is not limited to extract, as a line-of-sight switched object, an object that has come into the field of view and then went out thereof within a predetermined period. Alternatively, the visually recognized object identifying unit 42C can extract, as a line-of-sight switched object, an object that has overlapped with the line of sight of the user U and then did not overlap therewith within a predetermined period. In that case, for example, the visually recognized object identifying unit 42C extracts, as a line-of-sight switched object, an object that has been present in a predetermined region (for example, the central region) in the image captured at a certain time but was not present in the predetermined region (for example, the central region) in the image captured within a predetermined time from the certain time. Meanwhile, in order to identify the type of the line-of-sight switched object, any arbitrary method can be implemented. For example, in an identical manner to the first embodiment, an AI model can be used to identify the type of the line-of-sight switched object.

Herein, the predetermined period can be set in an arbitrary manner. However, it is desirable that, for example, the predetermined period is equal to or longer than 200 milliseconds and equal to or shorter than 900 milliseconds. As far as the brain science is concerned, when a known type of stimulus is given, a reaction time for a specific type of reaction to the stimulus (i.e., a simple detection task) is said to be in an approximate range of 150 milliseconds and 300 milliseconds. However, in the fourth embodiment, in order to appropriately detect a reaction of looking away from the object after looking at a particular object and then determining to not want to look at the object, it is desirable that not only a simple reaction time is taken into account but a discrimination reaction time required for the determination is also taken into account. That is, in the fourth embodiment, it is desirable to set the predetermined period to be equal to or longer than 200 milliseconds and equal to or shorter than 900 milliseconds, so that a line-of-sight movement time between two objects (i.e., the simple reaction time) and the discrimination reaction time for the determination can be appropriately taken into account.

Based on the identification result by the visually recognized object identifying unit 42C, the line-of-sight switch count identifying unit 70 identifies the line-of-sight switch count indicating the number of times by which the user U looked away from the object of the same type (Step S64). Herein, for each type of line-of-sight switched objects, the line-of-sight switch count identifying unit 70 counts, as the line-of-sight switch count, the number of times by which the object is extracted as the line-of-sight switched object, and stores the line-of-sight switch count in the storage 24. That is, the line-of-sight switch count identifying unit 70 identifies, as the line-of-sight switch count, the number of times for which a line-of-sight switched object of the same type is extracted. For example, if a line-of-sight switched object of the type "spider" is extracted for five times at different timings, then the line-of-sight switch count identifying unit 70 identifies the count of five as the line-of-sight switch count for spiders.

Subsequently, after a predetermined period has passed, the line-of-sight switch count identifying unit 70 can reset the line-of-sight switch count to zero. That is, the line-of-sight switch count identifying unit 70 can set, as the line-of-sight switch count, the number of times by which the visually recognized object identifying unit 42C has extracted a line-of-sight switched object of the same type within a predetermined period. The predetermined period can be set in an arbitrary manner. For example, one month can be set, or one year can be set.

Based on the line-of-sight switch count, the display mode setting unit 46C sets the display mode of the sub image PS. Thus, the display mode setting unit 46C sets the display mode for the object of the same type as the line-of-sight switched object for which the line-of-sight switch count is counted based on the line-of-sight switch count. More particularly, as illustrated in FIG. 16, the display mode setting unit 46C determines whether the line-of-sight switch count is equal to or greater than a predetermined count (Step S66). If the line-of-sight switch count is equal to or greater than a predetermined count (Yes at Step S66), then the display mode setting unit 46C sets the display mode of the sub image PS for the object of the same type as the line-of-sight switched object (Step S68) to the non-display mode. For example, if the line-of-sight switch count of the object of the type "spider" is equal to or greater than a predetermined count, then the non-display mode is set for the sub image PS for the spider.

On the other hand, if the line-of-sight switch count is not equal to or greater than the predetermined count (No at Step S66), that is, if the line-of-sight switch count is smaller than the predetermined count, then the system control proceeds to Step S70 without setting the display mode to the non-display mode. Subsequently, if the processes are to be ended (Yes at Step S70), then the processes are ended. On the other hand, if the processes are not to be ended (No at Step S70), then the system control returns to Step S60 and the processes are performed again.

Meanwhile, after a predetermined period has passed since the display mode was set to the non-display mode, the display mode setting unit 46C can discontinue the non-display mode and switch to a display mode in which the sub image PS is displayed.

Sub Image Display Process

Based on the display mode set by the display mode setting unit 46C, the output controller 48C displays, in the display 22, the sub image PS for the visually recognized object extracted by the visually recognized object identifying unit 42 (i.e., the object present within the field of view of the user U). For example, in an identical manner to the first embodiment, if the sub image PS for the extracted visually recognized object is set to have the highlighted mode, then the output controller 48C displays the sub image PS in the highlighted mode. On the other hand, if the sub image PS for the extracted visually recognized object is set to have the normal mode, then the output controller 48C displays the sub image PS in the normal mode. Moreover, if the sub image PS for the extracted visually recognized object is set to have the non-display mode, then the output controller 48C does not display the sub image PS for the visually recognized object.

As explained above, the display device 10 according to the fourth embodiment includes the display 22 for display-ing images, the imager 28, the visually recognized object identifying unit 42C, the line-of-sight switch count identifying unit 70, and the output controller 48C. The imager 28 captures an image of the object present within the field of view of the user U. Based on the image captured by the imager 28, the visually recognized object identifying unit 42C identifies the type of the object from which the user U looked away within a predetermined period (i.e., a line-of-sight switched object). Based on the identification result by the visually recognized object identifying unit 42C, the line-of-sight switch count identifying unit 70 identifies the line-of-sight switch count indicating the number of times by which the user U looked away from the object of the same type. The output controller 48C displays the sub image PS in the display 22 in a superimposed manner onto the main image PM within the field of the view of the user U as viewed through the display 22. When the line-of-sight switch count becomes equal to or greater than a predetermined count, the output controller 48C stops displaying the sub image PS that includes the information for the object of that type.

Sometimes there is an object at which the user U does not wish to look. If the sub image PS is displayed for an object at which the user U does not wish to look, then the user U may become conscious about that object, and may ふぇえ | offended. In contrast, in the display device 10C according to the fourth embodiment, regarding an object from which the user U has looked away for many times, the display of the sub image PS for that object is stopped. Hence, in the display device 10C according to the third embodiment, a situation in which the user U feels offended can be prevented, and the display form can be appropriately adjusted in accordance with action of the user U.

Meanwhile, if the line-of-sight switch count is smaller than a predetermined count, then the output controller 48C displays the sub image PS in the display 22 in a superimposed manner onto the main image PM in which an object of the same type is present. In the display device 10C according to the fourth embodiment, by displaying the sub image PS for an object for which the count of looking away is low, the display form can be appropriately adjusted in accordance with actions of the user U.

Meanwhile, it is desirable that the predetermined period is equal to or longer than 200 milliseconds and equal to or shorter than 900 milliseconds. By setting the predetermined period of time within that range, the simple reaction time as well as the discrimination reaction time can be taken into account, and the display form can be appropriately adjusted in accordance with actions of the user U.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

Thus, according to the present application, the display form can be appropriately adjusted in accordance with the user.

The display device, the display method, and the non-transitory storage medium according to the present application can be used for displaying images, for example.

What is claimed is:

1. A display device comprising:
a display in which an image is displayed;
an output controller configured to display an image in the display;

an imager configured to capture an image of an object present within a field of view of a user;
a visually recognized object identifying unit configured to identify, based on the image captured by the imager, a type of the object present within the field of view of the user; and
a visual recognition count identifying unit configured to identify, based on an identification result by the visually recognized object identifying unit, a visual recognition count which indicates a number of times by which the user has looked at the object for each of the identified type, wherein
the output controller is further configured to display in the display, based on the visual recognition count, a sub image which includes information on the object for each of the identified type;
the visually recognized object identifying unit is further configured to identify a type of an object that has been present in a predetermined region in the image captured by the imager but was not present in the predetermined region in the image captured by the imager within a predetermined time from a time of capturing the image;
the display device further comprises a line-of-sight switch count identifying unit configured to identify, based on an identification result by the visually recognized object identifying unit, a line-of-sight switch count which indicates a number of times by which the user has looked away from the object of a same type, and
when the line-of-sight switch count becomes equal to or greater than a predetermined count, the output controller is further configured to stop displaying of the sub image which includes the information on the object of the identified type.

2. The display device according to claim 1, wherein the output controller is further configured to display the sub image to be displayed in a highlighted manner when the visual recognition count is equal to or greater than a predetermined count as compared to the sub image to be displayed when the visual recognition count is smaller than the predetermined count.

3. The display device according to claim 1, further comprising:
a position information acquiring unit configured to acquire position information of the user; and
a visit count identifying unit configured to identify, based on the position information of the user, a visit count which indicates a number of times by which the user has visited a same place, wherein
the output controller is further configured to display the sub image in the display based on the visit count.

4. The display device according to claim 3, further comprising a repeat view count identifying unit configured to identify, based on an identification result by the visually recognized object identifying unit and the position information of the user, a repeat view count which indicates a number of times by which the user has looked at the object of a same type at a same place, wherein when the repeat view count is equal to or greater than a predetermined count, the output controller is further configured to stop displaying the sub image for the object.

5. The display device according to claim 1, wherein, when the line-of-sight switch count is smaller than the predetermined count, the output controller is further configured to display the sub image in the display.

6. The display device according to claim 1, wherein the predetermined period is equal to or longer than 200 milliseconds and equal to or shorter than 900 milliseconds.

7. The display device according to claim 1, further comprising:
a position information acquiring unit configured to acquire position information of a user; and
a visit count identifying unit configured to identify, based on the position information of the user, a visit count which indicates a number of times by which the user has visited a same place, wherein
the output controller is further configured to display in the display, based on the visit count, the sub image which includes information on an object of a same type as the object present within a predetermined distance range from a place visited by the user.

8. The display device according to claim 7, wherein the output controller is further configured to display the sub image to be displayed in a highlighted manner when the visit count is equal to or greater than a predetermined count as compared to the sub image to be displayed when the visit count is smaller than the predetermined count.

9. The display device according to claim 8, wherein, when an object of the same type comes into the field of view of the user at a place different from a place at which the visit count is equal to or greater than the predetermined count, the output controller is further configured to display the sub image for the object in a highlighted manner.

10. The display device according to claim 7, wherein, the visit count identifying unit is further configured to determine, when the user is present at the same place for a predetermined period or more, that the user has visited the same place.

11. A display method for displaying an image in a display, comprising:
acquiring a captured image in which an object present within field of view of a user is included;
identifying, based on the image, a type of the object present within the field of view of the user;
identifying, based on an identification result about the type of the object present within the field of view of the user, a visual recognition count which indicate a number of times by which the user has looked at the object for each of the identified type; and
displaying in the display, based on the visual recognition count, a sub image which includes information on the object for each of the identified type, wherein
at the identifying of the type of the object, a type of an object that has been present in a predetermined region in the image captured by the imager but was not present in the predetermined region in the image captured by the imager within a predetermined time from a time of capturing the image is identified, wherein
the display method further comprises:
identifying a line-of-sight switch count which indicates a number of times by which the user has looked away from the object of a same type based on the visual recognition count; and
stopping, when the line-of-sight switch count becomes equal to or greater than a predetermined count, the displaying of the sub image which includes the information on the object of the identified type.

12. A non-transitory storage medium that stores a computer program that causes a computer to execute a process comprising:
acquiring a captured image in which an object present within field of view of a user is included;
identifying, based on the image, a type of the object present within the field of view of the user;

identifying, based on an identification result about the type of the object present within the field of view of the user, a visual recognition count which indicate a number of times by which the user has looked at the object for each of the identified type; and displaying in the display, based on the visual recognition count, a sub image which includes information on the object for each of the identified type, wherein at the identifying of the type of the object, a type of an object that has been present in a predetermined region in the image captured by the imager but was not present in the predetermined region in the image captured by the imager within a predetermined time from a time of capturing the image is identified, wherein the process further comprises:

identifying a line-of-sight switch count which indicates a number of times by which the user has looked away from the object of a same type based on the visual recognition count; and stopping, when the line-of-sight switch count becomes equal to or greater than a predetermined count, the displaying of the sub image which includes the information on the object of the identified type.

\* \* \* \* \*